United States Patent [19]
Souder et al.

[11] Patent Number: 5,806,074
[45] Date of Patent: Sep. 8, 1998

[54] CONFIGURABLE CONFLICT RESOLUTION IN A COMPUTER IMPLEMENTED DISTRIBUTED DATABASE

[75] Inventors: Benny Souder, Belmont; Lip Boon Doo, San Jose; Alan Downing, Fremont, all of Calif.

[73] Assignee: Oracle Corporation, Redwood City, Calif.

[21] Appl. No.: 618,507

[22] Filed: Mar. 19, 1996

[51] Int. Cl.⁶ .................................................. G06F 17/30
[52] U.S. Cl. ............................................. 707/201; 707/10
[58] Field of Search ............................. 395/617; 707/201

[56] References Cited

U.S. PATENT DOCUMENTS

| | | | |
|---|---|---|---|
| 4,432,057 | 2/1984 | Daniell et al. | 395/608 |
| 4,455,619 | 6/1984 | Masui et al. | 364/900 |
| 4,558,413 | 12/1985 | Schmidt et al. | 364/300 |
| 4,734,854 | 3/1988 | Afshar | 364/200 |
| 4,809,170 | 2/1989 | Leblang et al. | 364/200 |
| 4,833,604 | 5/1989 | Cheng et al. | 364/200 |
| 4,866,611 | 9/1989 | Cree et al. | 364/705.08 |
| 4,866,638 | 9/1989 | Cosentino et al. | 364/521 |
| 4,888,690 | 12/1989 | Huber | 364/200 |
| 4,893,232 | 1/1990 | Shimaoka et al. | 364/200 |
| 4,894,771 | 1/1990 | Kunii et al. | 364/200 |
| 4,930,071 | 5/1990 | Tou et al. | 364/300 |
| 4,939,689 | 7/1990 | Davis et al. | 364/900 |
| 4,956,773 | 9/1990 | Saito et al. | 364/200 |
| 5,016,204 | 5/1991 | Simoudis et al. | 364/578 |
| 5,084,813 | 1/1992 | Ono | 395/1 |
| 5,202,996 | 4/1993 | Sugino et al. | 395/700 |
| 5,212,788 | 5/1993 | Lomet et al. | 395/617 |
| 5,241,675 | 8/1993 | Sheth et al. | 395/608 |
| 5,261,094 | 11/1993 | Everson et al. | 707/201 |
| 5,295,222 | 3/1994 | Wadhwa et al. | 395/1 |
| 5,301,316 | 4/1994 | Hamilton et al. | 707/1 |
| 5,327,555 | 7/1994 | Anderson | 395/617 |
| 5,386,559 | 1/1995 | Eisenberg et al. | 395/617 |
| 5,434,994 | 7/1995 | Shaheen et al. | 395/617 |
| 5,613,079 | 3/1997 | Deblique et al. | 711/141 |
| 5,625,818 | 4/1997 | Zarmer et al. | 707/104 |

OTHER PUBLICATIONS

Huang et al, Experimental Evaluation of Real–Time Transaction Processing, Real–Time Systems Symponium, 5–7 Dec. 1989, IEEE Computer Society Press, pp. 144–153.

Carey et al, ICRSS: Interactive Conflict Resolution Support System, Proc of the Twenty–second Annual Hawaii International Conference on System Sciences, vol. III, 3–6 Jan. 1989, pp. 512–516.

Fishman et al, A New Perspective on Conflict Resolution in Market Forecasting, The First International Conference on Artificial Intelligence on Wall Street, 9–11 Oct. 1991, pp. 97–102.

Primary Examiner—Wayne Amsbury
Attorney, Agent, or Firm—Blakely, Sokoloff, Taylor & Zafman LLP

[57] ABSTRACT

An apparatus and method for providing adaptable and configurable conflict resolution within a replicated data environment is disclosed. In a distributed database system having a first node and a second node, the first node including a first data structure, the second node including a second data structure, a configurable conflict resolution apparatus is disclosed as comprising; 1) a conflict detection module for detecting a conflicting modification to corresponding portions of the first and the second data structures; 2) a plurality of conflict resolution methods, one or more of the plurality of conflict resolution methods being configurably associated with the corresponding portions of the first and the second data structures; and 3) a conflict resolution module for activating a first conflict resolution method of the one or more of the plurality of conflict resolution methods when the conflict detection module detects the conflicting modification to the corresponding portions of the first and the second data structures.

48 Claims, 19 Drawing Sheets

| TIME | ACTION | SITE A | SITE B | SITE C |
|---|---|---|---|---|
| 1 | ALL SITES ARE UP AND AGREE THAT X = 2. | 2 | 2 | 2 |
| 2 | SITE A UPDATES X = 5. | 5 | 2 | 2 |
| 3 | SITE C BECOMES UNAVALIABLE. | 5 | 2 | DOWN |
| 4 | SITE A PUSHES UPDATE TO SITE B.<br>SITE A AND SITE B STILL AGREE THAT X = 5.<br><br>SITE C IS STILL UNAVAILABLE.<br>THE UPDATE TRANSACTION REMAINS IN<br>THE QUEUE AT SITE A. | 5 | 5 | DOWN |
| 5 | SITE C BECOMES AVAILABLE WITH X = 2.<br>SITES A AND B AGREE THAT X = 5. | 5 | 5 | 2 |
| 6 | SITE B UPDATES X = 5 TO X = 7 | 5 | 7 | 2 |
| 7 | SITE B PUSHES THE TRANSACTION TO SITE A.<br>SITES A AND B AGREE THAT X = 7.<br>SITE C STILL SAYS X = 2 | 7 | 7 | 2 |
| 8 | SITE B PUSHES THE TRANSACTION TO SITE C.<br>SITE C SAYS THE OLD VALUE OF X = 2;<br>SITE B SAYS THE OLD VALUE OF X = 5.<br>ORACLE DETECTS A CONFLICT AND<br>RESOLVES IT BY APPLYING THE UPDATE<br>FROM SITE B, WHICH HAS A HIGHER PRIORITY<br>LEVEL (25) THAN SITE C (10).<br>ALL SITE AGREE THAT X = 7. | 7 | 7 | 7 |
| 9 | SITE A SUCCESSFULLY PUSHES ITS<br>TRANSACTION (X = 5) TO SITE C.<br>ORACLE DETECTS A CONFLICT BECAUSE<br>THE CURRENT VALUE AT SITE C (X = 7)<br>DOES NOT MATCH THE OLD VALUE AT<br>SITE A (X = 2).<br><br>SITE A HAS A HIGHER PRIORITY (30)<br>THAN SITE C (10).<br>ORACLE RESOLVES THE CONFLICT BY<br>APPLYING THE OUTDATED UPDATE FROM<br>SITE A (X = 5)<br><br>BECAUSE OF THIS ORDERING CONFLICT,<br>THE SITES NO LONGER CONVERGE. | 7 | 7 | 5 |

*FIG. 6*

| CONFLICT TYPE | RESOLUTION METHODS | CONVERGENCE? | CONVERGENCE WITH MULTIPLE MASTERS? |
|---|---|---|---|
| UPDATE | MINIMUM | YES | NO, UNLESS ALWAYS DECREASING |
| | MAXIMUM | YES | NO, UNLESS ALWAYS INCREASING |
| | EARLIEST TIMESTAMP | YES | NO |
| | LATEST TIMESTAMP | YES | YES, WITH BACKUP METHOD |
| | PRIORITY GROUP | YES | NO, UNLESS ALWAYS INCREASING |
| | SITE PRIORITY | YES | NO |
| | OVERWRITE | YES, ONE MASTER ONLY | NO |
| | DISCARD | YES, ONE MASTER ONLY | NO |
| | AVERAGE | YES, ONE MASTER ONLY | NO |
| | ADDITIVE | YES | YES |
| | USER FUNCTION | DEPENDS ON USER DEFINED FUNCTION | DEPENDS ON USER DEFINED FUNCTION |
| UNIQUENESS CONSTRAINT | APPEND SITE NAME | NO | NO |
| | APPEND SEQUENCE | NO | NO |
| | IGNORE DISCARD | NO | NO |
| | USER FUNCTION | DEPENDS ON USER DEFINED FUNCTION | DEPENDS ON USER DEFINED FUNCTION |
| DELETE | USER FUNCTION | DEPENDS ON USER DEFINED FUNCTION | DEPENDS ON USER DEFINED FUNCTION |

*FIG. 7*

PRIORITY VIEW — 910

| ... | PRIORITY-GROUP | PRIORITY | ... | VALUE |
|---|---|---|---|---|
| | site-priority | 1 | | houston.world |
| | site-priority | 2 | | new_york.world |
| | order-status | 1 | | shipped |
| | order-status | 2 | | billed |
| | ... | ... | | ... |

*FIG. 8* credit_status Table — 920

| custno | status | site |
|---|---|---|
| 153 | 30 day | new_york.world |
| 118 | 30 day | houston.world |
| 121 | cash | houston.world |
| 204 | 30 day | houston.world |
| . | . | . |
| . | . | . |

CONFIGURABLE CONFLICT RESOLUTION IN A COMPUTER IMPLEMENTED DISTRIBUTED DATABASE

FIELD OF THE INVENTION

The present invention relates to computer implemented database systems. Specifically, the present invention relates to conflict resolution a database system.

DESCRIPTION OF RELATED ART

Modern data processing systems, once the domain of large centralized mainframe computers, have evolved into collections of dispersed independent processing systems interconnected by networked links. That is, modern systems are distributed over many interconnected processing nodes. The efficiency of these distributed systems depends not only upon the processing power of each independent node, but also upon the ability of the system to efficiently move information between processing nodes across the network. It is common for these distributed data processing systems to support the execution of complex application programs which typically access large databases of information. These application programs and distributed systems must be capable of operating across multiple processing platforms which can be geographically separated by great distances.

For example, many commercial business operations are geographically dispersed. Some locations may perform manufacturing or product development while other locations perform sales, marketing, inventory control, billing, or various administrative functions. These business operations require the use of various types of business data including, for example, customer data, order data, shipping data, billing data, etc. It will be apparent to those of ordinary skill in the art that many other types of information may be required to allow a particular business operation to run efficiently. These various types of business information are stored in distributed systems for access by application programs executed by the data processing systems at the local and remote business locations. These data processing systems, called nodes herein, typically include computers, processors, or terminals physically resident at the same proximate location. The distributed systems being accessed by these complex application programs are typically comprised of many tables, arrays, files, and other complex interdependent data structures and related programs.

A conventional distributed database technology is replication. Using this methodology, multiple replicas or instantiations of data structures or programs can exist in more than one database in a distributed system. In a typical scenario, a remote database would be used to access a local node in which a desired distributed data structure is resident. The remote node would then transfer a copy of the data structure to itself for local processing without the need for distributed transactions. Although replication increases the speed of accessing a particular data structure, this methodology produces a problem of maintaining coherency between multiple replicas of the same data structure or program. For example, two different nodes may replicate a distributed data structure and concurrently modify the data structure differently. It then becomes very difficult to reconcile the two modified replicas or to merge the updates into a composite version of the data structure. Thus, multiple modifiable replicas of a data structure introduces a coherency problem.

Within the replication methodology, two basic conventional techniques are used for maintaining coherency among multiple replicas of the same data structure. First, synchronous replication may be used. In synchronous (not asynchronous) replication, each update or modification of a data structure is immediately replicated to all other replicas of the data structure existing on any other processing node of the distributed system as part of their local transaction. The data structure modification is not allowed to complete until all other replicas of the data structure have been similarly updated. In this manner, all replicas of the data structure across the distributed system are guaranteed to be the same. Although the synchronous replication methodology provides a simple means for maintaining distributed system coherency, this method is sensitive to network latencies and intermittent network failures and does not work at all for dormant clients. Dormant clients are those that cannot perform an update to a data structure within a predetermined time period. Because each data structure modification is stalled until all nodes have been updated, network delays impact each such modification. Further, synchronous replication does not provide a means for differentiating particular data access transactions as higher or lower priority. Thus, low priority accesses can still produce significant system delays when this result may be unnecessary.

The second conventional method for maintaining data structure coherency in a replication methodology is asynchronous replication. Using this method, local replicas of a particular data structure can be slightly different for a time until an asynchronous update is performed. In asynchronous replication, a distributed node can modify its local copy of a data structure without forcing a network access as in the synchronous replication methodology. At a predetermined time interval or on demand, all previously un-replicated distributed data structure modifications are combined into a minimal set of updates which are transferred across the network at one time and applied to all other replicas of the data structure. The asynchronous replication method provides a means for balancing network traffic over time. The asynchronous method also provides an effective means for tuning the performance of a particular distributed system; however, a problem of data update conflicts is introduced. Data update conflicts occur when two distributed nodes modify the same data object in a distributed data structure before the asynchronous update process has executed. In this situation, two data objects may be validly updated locally at two different distributed processing nodes; however, an invalid combination of the two data objects may be produced when the updates to the data objects are propagated to other nodes. Although these conflicts can usually be reduced, it is important in designing any distributed system to understand and minimize these conflicts as much as possible.

Typically, remote accesses between nodes are performed using a conventional data manipulation language such as SQL or other conventional protocol. Alternatively, the remote database can use a remote procedure call (RPC) to activate a data access procedure on the local database in a synchronous RPC context. In a synchronous context, the remote database waits for the RPC to finish before completing the transaction. An RPC can also be used to queue a request on the local system in an asynchronous RPC context. In an asynchronous context, the remote database does not wait for the RPC to finish before completing the transaction. The use of a remote procedure call is well known to those of ordinary skill in the art.

Another form of replication is procedural replication. In procedural replication, a procedure invocation is replicated to other nodes in a distributed system. This is different from an RPC in that the RPC only produces a procedure execution in the remote node. In procedural replication, a procedure execution is produced in both the local node and the remote node. As in the use of RPCs, both synchronous and asynchronous forms of procedural replication can be implemented. The synchronous form stalls the transaction until the procedure execution is completed, while the asynchronous form allows the transaction to continue before the procedure execution has completed.

Multiple sites in a distributed computing environment often have need to share information. Various models have been employed in the prior art to support data sharing. One model employs a single centralized database which is shared among multiple users at each distributed site. Using this model, only one copy of the data is maintained in the centralized database. This model, however, suffers performance limitations because each of the distributed sites are competing for access to the same database. A second conventional shared database model used multiple copies of a database, each resident at the distributed computing sites. As long as each distributed site operates in a read-only mode (i.e., no data modifications to the shared database), multiple copies of the same data item can be located at multiple sites without raising any data integrity issues. However, as multiple users at multiple system locations begin to modify one or more of the copies of the same data items, data integrity becomes a critical issue. As a solution to the data integrity problems caused by data modifications or updates to a shared database, conventional systems employ a distributed database configuration wherein a master copy of the database resides at one site and slave copies reside at any of the other distributed sites. Any modifications to the database are performed only on the master site with the slave locations receiving a copy of the modified data after the modification is completed on the master site. Thus, a user at a slave location must access the master copy to modify a data item. This technique does not provide the ability to update any copy of the data and to propagate the changes performed on that copy to all other copies of the data.

A third technique for distributed data sharing is described in copending U.S. patent application Ser. No. 08/126,586, titled "Method and Apparatus for Data Replication", filed Sep. 24, 1993 and assigned to the assignee of the present application, now abandoned. In this co-pending application, data replication in a networked computing environment is described as allowing duplicate copies of the same data to be resident at more than one site on the network. Any data modifications or updates are replicated to all other sites in an asynchronous manner. In this way, modifications to the shared data can be duplicated at other sites thereby preserving data integrity at each of the distributed sites. Various details of the replication technique as employed with a database having multiple rows, each row having multiple columns or attributes, is described in the above-referenced co-pending patent application.

Another technique for asynchronous data replication is updatable snapshots. Updatable snapshots are defined to contain a full copy of a master table or a defined subset of the rows in the master table that satisfy a value-based selection criterion. Snapshots are refreshed from the master at time-based intervals or on demand. Any changes to the snapshot are propagated and applied to masters using asynchronous RPCs as the underlying mechanism. Any changes to the master table since the last refresh are then propagated and applied to the snapshot. A snapshot table can only have one master table, but a master table can be the master for many snapshots.

Using replication, update conflicts may occur if two sites concurrently modify the same data item before the data modification can be propagated to other sites. If update conflicts are not handled in some convergent manner, the data integrity of the replicated copies will begin to diverge. It is therefore necessary to first detect update conflicts and secondly to resolve these conflicts in a manner that allows sustained data integrity.

Prior art data replication systems either do not handle update conflicts at all or handle conflicts in a rigid and fixed manner. Those conventional systems that do not handle update conflicts at all require that a particular shared database environment be configured in a way to prevent update conflicts such as by partitioning data appropriately. Other conventional data replication systems detect some update conflicts and respond in a predetermined and fixed manner. This rigid conflict resolution technique of the prior art, however, limits significantly the adaptability of a replication system to a particular application or user environment. Conflict resolution is usually highly application specific. Depending upon the application of particular data items in a shared database, a desired conflict resolution method may vary significantly from one application to the next.

If all sites (or nodes) in a replicated environment, such as the one illustrated in FIG. 1, are propagating database changes synchronously, conflicting updates cannot occur, and there is no need to designate a conflict resolution method. However, if any sites in the replicated environment are propagating changes asynchronously, it is advisable to designate a conflict resolution method for each replicated table. Even if the data environment has been designed to avoid conflicts (for example, by partitioning data ownership) there should be provided at a minimum some form of notification mechanism to alert someone if an unexpected conflict does occur.

Sometimes it may be necessary to provide multiple conflict resolution methods for a single column or group of columns. These methods would then be applied in order (using a specified priority ranking) until the conflict is resolved.

This is useful for a variety of reasons. For example, there might be a preferred method of resolving a conflict that might not always be successful. In this event, a backup method could be provided to have a greater chance of not requiring manual intervention to resolve the error. In another case, a user-defined method could be provided that performs logging or notification if the conflict cannot be resolved. It would be advantageous to be able to mix any number of user-defined and previously supplied conflict resolution routines.

Another reason for needing multiple conflict resolution methods is if a particular method is selected, such as latest timestamp, it would be advantageous to provide a backup method to guarantee success. The latest timestamp method uses a special timestamp column to determine and apply the most recent change. In the unlikely event that the row at the originating site and the row at another site were changed at precisely the same time, a backup method, such as site priority, could be provided to break this tie. Prior art systems do not provide a capability for handling database conflict problems using multiple conflict resolution methods.

Thus, a better means and method for handling update, uniqueness, and delete conflicts in a replicated database environment is needed.

SUMMARY OF THE INVENTION

The present invention is a means and method for providing adaptable and configurable conflict resolution within a replicated data environment. In a distributed database system having a first node and a second node, the first node including a first data structure, the second node including a second data structure, the present invention is a configurable conflict resolution apparatus comprising; 1) a conflict detection module for detecting a conflicting modification to corresponding portions of the first and the second data structures; 2) a plurality of conflict resolution methods, one or more of the plurality of conflict resolution methods being configurably associated with the corresponding portions of the first and the second data structures; and 3) a conflict resolution module for activating a first conflict resolution method of the one or more of the plurality of conflict resolution methods when the conflict detection module detects the conflicting modification to the corresponding portions of the first and the second data structures.

Therefore, it is an advantage of the present invention that configurable conflict resolution allows complete flexibility of conflict resolution specification. It is a further advantage of the present invention that configurable conflict resolution includes detection and resolution of update, uniqueness, and delete conflicts. It is a further advantage of the present invention that system-provided conflict resolution methods are declarative and user-extensible. It is a further advantage of the present invention that various system-provided or user-extended conflict resolution methods can be applied to resolve a particular conflict. It is a further advantage of the present invention that a plurality of conflict resolution methods will be applied to a particular conflict until resolution of the conflict is achieved or no more methods are available. It is a further advantage of the present invention that a plurality of conflict resolution methods will be applied in the user-specified priority order to a particular conflict. It is a further advantage of the present invention that a different update conflict resolution method or set of methods may be specified and employed for each column in a database table. It is a further advantage of the present invention that a different uniqueness conflict resolution method or set of methods may be specified and employed for each uniqueness constraint in a database table. It is a further advantage of the present invention that detection and resolution of update conflicts are based on column groups, each of which is a collection of columns logically treated as a single column, in a database table. It is a further advantage of the present invention that results of conflict resolutions can be collected optionally for analysis.

BRIEF DESCRIPTION OF THE DRAWINGS

The features and advantages of the present invention will be apparent from the accompanying drawings and from the detailed description of the preferred embodiment of the present invention as set forth below.

FIG. 6 illustrates a typical update ordering conflict scenario.

FIG. 7 illustrates the conflict resolution methods provided in the preferred embodiment.

FIGS. 8 and 9 illustrate an example of priority groups.

DETAILED DESCRIPTION OF THE PREFERRED EMBODIMENT

The present invention is a means and method for providing adaptable and configurable conflict resolution in a replicated database system. In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and processes have not been shown in detail in order not to unnecessarily obscure the present invention.

Figure 1:
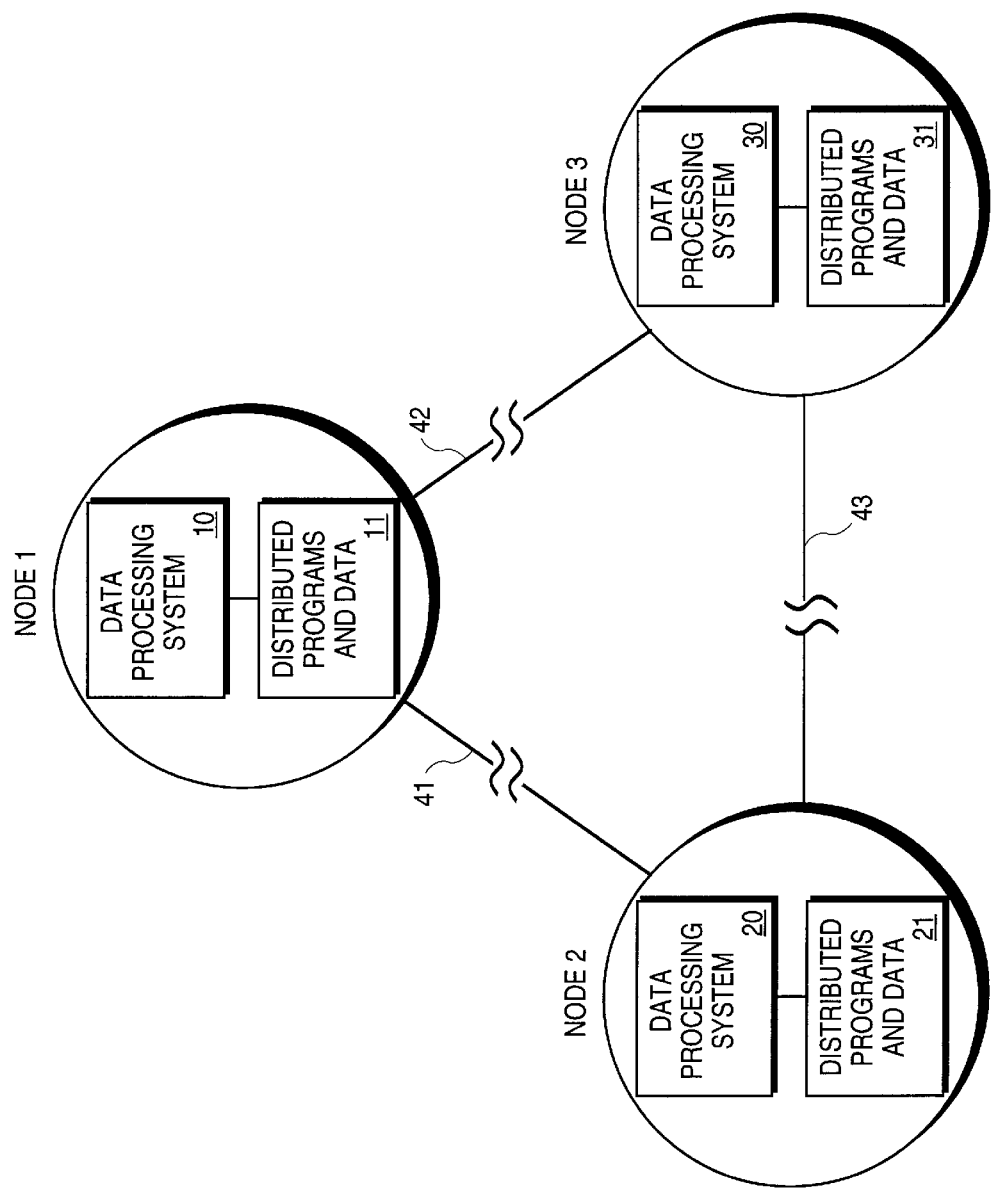
FIG. 1 illustrates a typical distributed data processing system.

FIG. 1 illustrates a typical distributed data processing system comprising node 1, node 2, and node 3 coupled together with network links 41, 42, and 43. It will be apparent to those of ordinary skill in the art that an arbitrary number of nodes in the distributed system may be supported in an arbitrary configuration. Each node, such as node 1, comprises a data processing system 10 and a set of distributed programs and data 11 stored in a distributed data store (not shown). The distributed data store can be main memory 104 or mass storage device 107 shown in FIG. 2. A typical architecture of data processing system 10 is described below in connection with FIG. 2. Distributed data 11 comprises a set of programs, data structures, and data objects which may be shared or replicated by other nodes in the distributed system. Distributed data 11, for example, comprises a set of data structures available to other nodes in the distributed processing system. Data processing system 10 may directly access distributed data 11; because, distributed data 11 is local (i.e. located within the same node) to data processing system 10. In this situation, access between data processing system 10 and distributed data 11 does not require a network access. Typically, these local accesses can be performed more quickly than accesses requiring a network communication. Other nodes (node 2 and node 3) of the distributed system illustrated in FIG. 1 must access distributed data 11 via a network access. For example, node 2 and the data processing system 20 therein must access distributed data 11 via network link 41.

This network access can be the result of a distributed transaction or a replication operation, for example. As described above, other forms of distributed transfer technologies can cause network accesses. In a distributed transaction system, the data processing system 20 of node 2 accesses and manipulates distributed data 11 within the distributed data store of node 1. In a replication system, after a local version of the distributed data 11 within the distributed data store of node 1 has been transferred to the distributed data store of node 2, the data processing system 20 of node 2 accesses distributed data 11 within the distributed data store of node 1 locally within node 2. This local copy of the distributed data 21 within the distributed data store of node 2 may subsequently be manipulated locally by data processing system 20.

The hardware architecture of nodes within the distributed processing system, such as the one illustrated in FIG. 1, can be varied and diverse. There is no requirement in the present invention that each node have equivalent and compatible processing systems. It is only necessary that each node of the distributed processing system be able to communicate on a network or some communication path coupling the nodes together.

Figure 2:
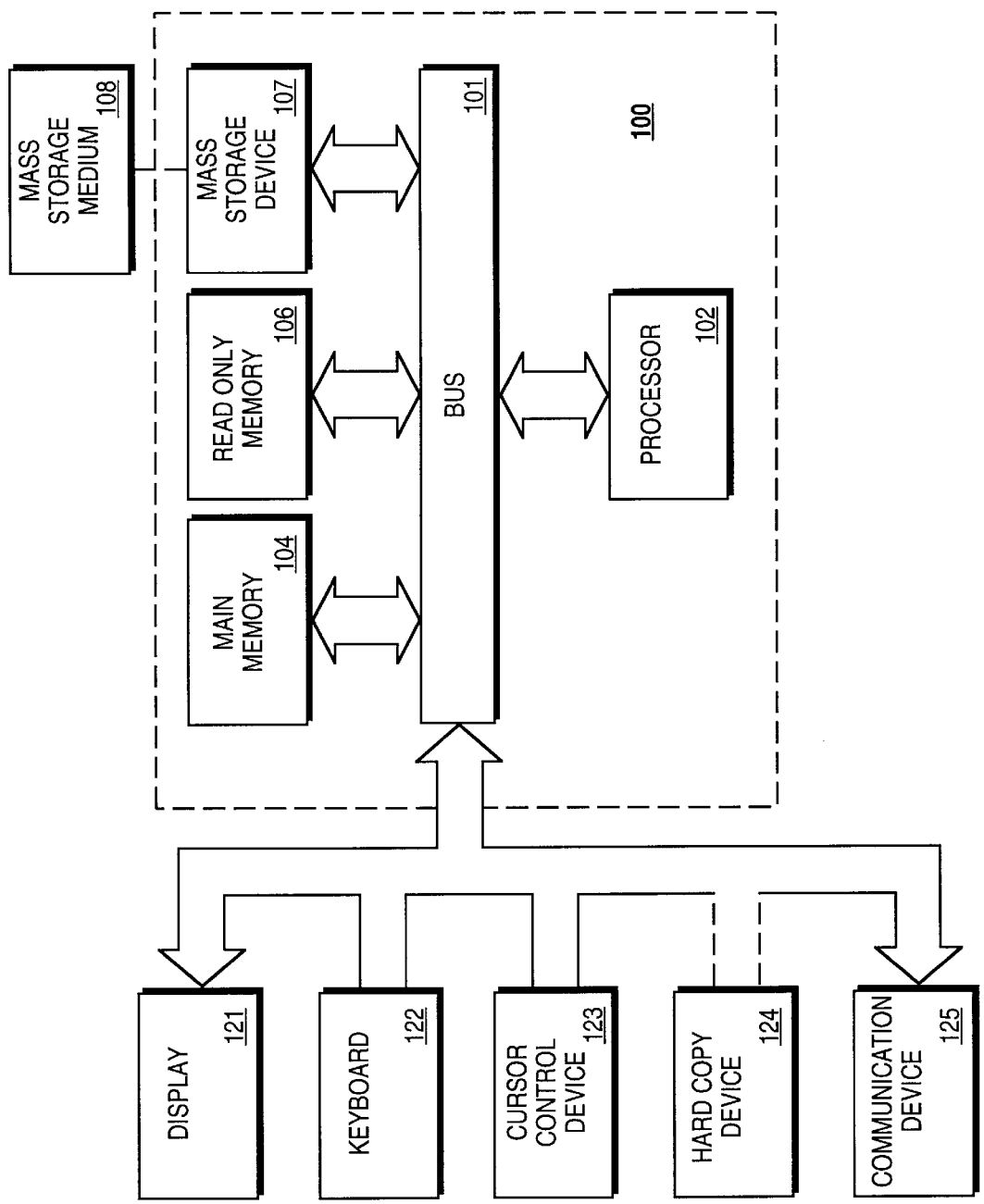
FIG. 2 illustrates a typical architecture of a data processing node within a distributed processing system.

FIG. 2 illustrates a typical data processing system upon which one embodiment of the present invention is implemented. It will be apparent to those of ordinary skill in the art, however that other alternative systems of various system architectures may also be used. The data processing system illustrated in FIG. 2 includes a bus or other internal communication means 101 for communicating information, and a processing means 102 coupled to the bus 101 for processing information. The system further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. The system may further be coupled to a display device 121, such as a cathode ray tube (CRT) or a liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys coupled to bus 101 for communicating direction information and command selections to processor 102, and for controlling cursor movement on display device 121. Another device which may optionally be coupled to bus 101 is a hard copy device 124 which may be used for printing instructions, data, or other information on a medium such as paper, film, or similar types of media. In the preferred embodiment, a communication device 125 is coupled to bus 101 for use in accessing other nodes of the distributed system via a network. This communication device 125 may include any of a number of commercially available networking peripheral devices such as those used for coupling to an Ethernet, token ring, Internet, or wide area network. Note that any or all of the components of the system illustrated in FIG. 2 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 2 is an IBM® compatible personal computer. Processor 102 may be one of the 80×86 compatible microprocessors such as the 80486 or PENTIUM® brand microprocessors manufactured by INTEL® Corporation of Santa Clara, Calif.

The distributed data, such as distributed data 11 illustrated in FIG. 1, can be stored in main memory 104, mass storage device 107, or other storage medium locally accessible to processor 102. It will also be apparent to those of ordinary skill in the art that the methods and processes described herein can be implemented as software stored in main memory 104 or read only memory 106 and executed by processor 102. This software may also be resident on an article of manufacture comprising a computer usable mass storage medium 108 having computer readable program code embodied therein and being readable by the mass storage device 107 and for causing the processor 102 to perform configurable conflict resolution in accordance with the teachings herein.

The following sections describe how to resolve update, uniqueness, and delete conflicts in an asynchronously replicated environment using the preferred embodiment of the present invention. General topics within these sections include the following: 1) the types of conflicts detected and resolved in the preferred embodiment, 2) how column groups are used in conflict detection, 3) detecting and resolving update, uniqueness, and delete conflicts, 4) how to select a conflict resolution method, 5) how to avoid ordering conflicts, 6) the details of particular update, uniqueness and delete conflict resolution methods, 7) how to use column groups, priority groups, and site priority, and 8) how to provide automatic generation of audit information. It will be apparent to those of ordinary skill in the art that the preferred embodiment of the present invention is disclosed. Other alternative embodiments are within the scope of the present invention.

Types of Conflicts

Figure 3:
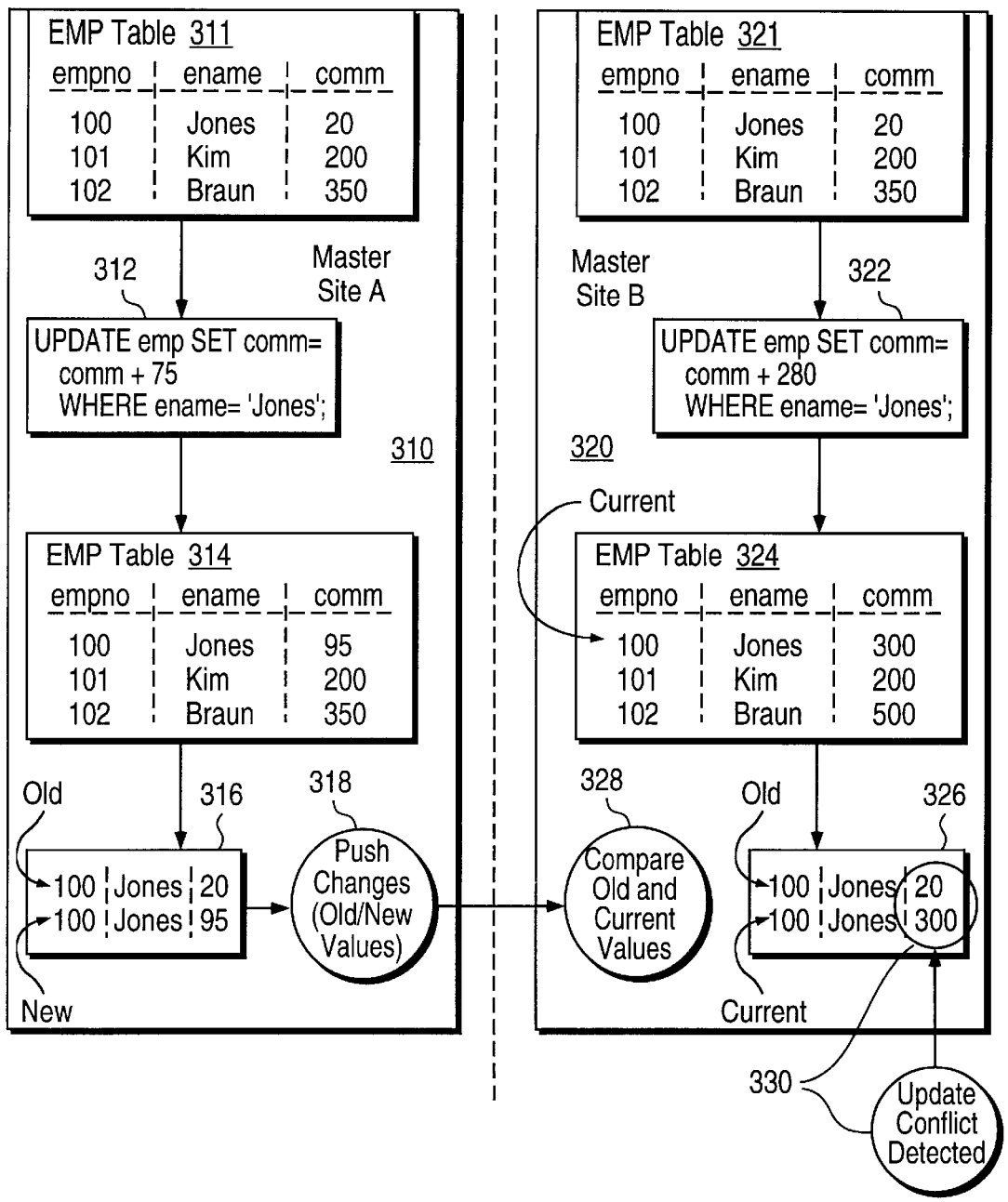
FIG. 3 illustrates a typical update conflict scenario.

Referring to FIG. 3, an example illustrates a typical update conflict scenario. In the example of FIG. 3, a master site A 310 and a master site B 320 is shown. An update operation 312 is performed on a table 311 at site 310 to produce table 314. A different update operation 322 is performed on table 321 at site 320 to produce table 324. The present invention uses the modification information 316 and 326 and compares the old and new values of the row from the originating site with the old and current values for the same row at the receiving site 320. The present invention detects a conflict 330 if there are any differences between these values for any column in the row. If no conflicts are detected, the row at the receiving site is modified to contain the new value for each column. If a conflict is detected, the present invention applies one or more of the appropriate conflict resolution routines in priority order until the conflict is resolved, or until no more conflict resolution routines are available. Any unresolved conflicts are logged as errors.

There are three types of conflicts detected by the preferred embodiment of the present invention. These conflicts are: 1) uniqueness conflicts, 2) update conflicts, and 3) delete conflicts. It will be apparent to those of ordinary skill in the art that other conflicts may equivalently be defined.

Figure 10:
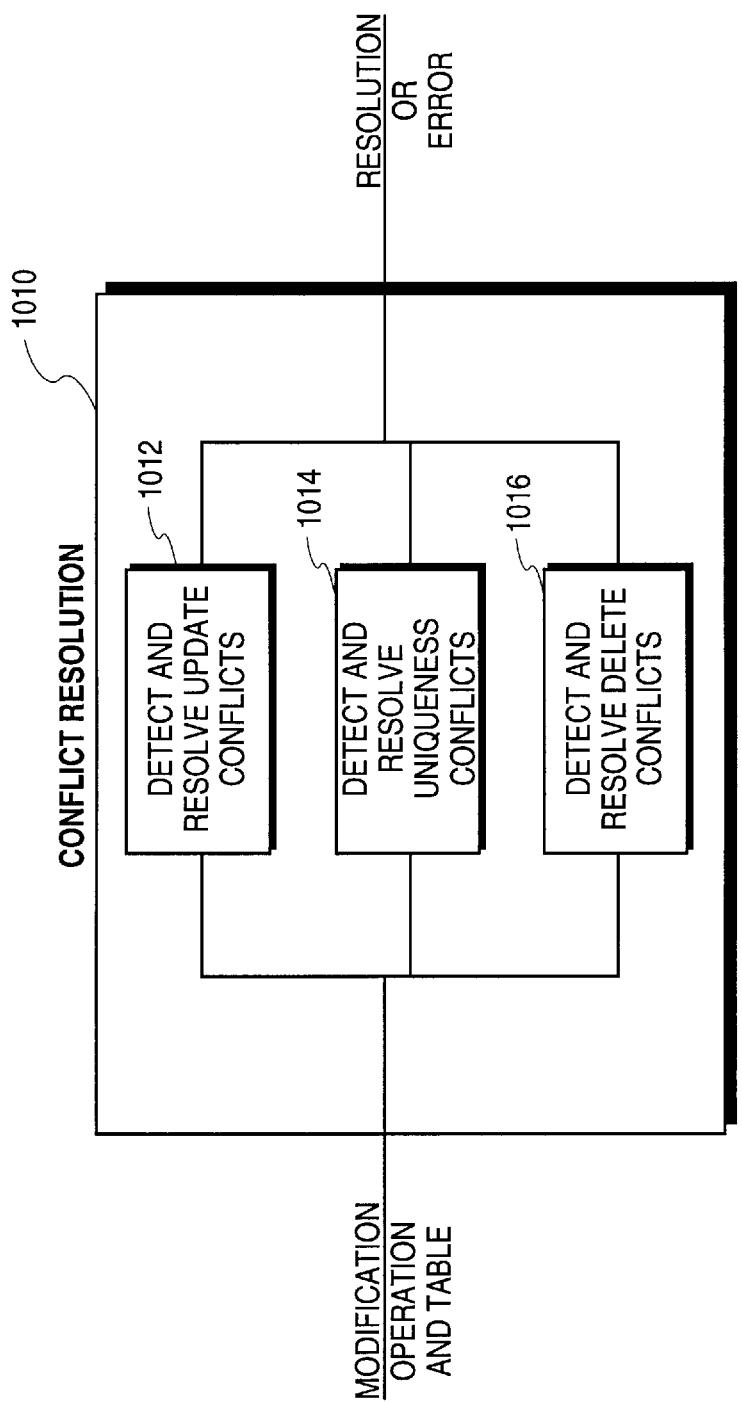
FIG. 10 illustrates the three types of conflict resolution provided by the present invention.

Referring to FIG. 10, the basic conflict resolution functional block 1010 of the preferred embodiment of the present invention is shown. The conflict resolution functional block 1010 receives a table identifier and a modification operation related to the identified table. This information is used by the conflict resolution functional block 1010 to detect and resolve update conflicts in block 1012, to detect and resolve uniqueness conflicts in block 1014, and to detect and resolve delete conflicts in block 1016. The details of the processing performed in block 1010 are shown and described in the following sections.

Detecting and Resolving Update Conflicts

The present invention uses the concept of a column group to detect and resolve update conflicts. A column group links a collection of columns in a table to a single "logical column". A column group can consist of any number of columns, from a single column, to all of the columns in a table. Each column, however, can belong to only one column group.

Because the update conflict detection mechanism or module of the preferred embodiment detects conflicts on a column group by column group basis, all columns must be a part of some column group. However, all of the columns in a table need not be assigned to a column group. Any column not assigned to a column group is automatically assigned by the present invention to a "shadow" column group for the purpose of conflict detection. This shadow column group is not user visible, and you cannot assign a conflict resolution method to the columns in the group. You can only designate a conflict resolution method for columns in a user-defined column group.

By defining column groups, it is possible to associate different methods of resolving conflicts for different types of data. For example, numeric data lends itself well to some sort of arithmetic method of resolving conflicts, while conflicts with character data might be better resolved using a timestamp to apply the most recent change.

Because each column group is evaluated individually, portions of a row in a table may be updated using the data from the originating site, while other portions may maintain the values of the data at the destination site. That is, although the use of a conflict resolution mechanism may result in convergence (ultimately all sites have the same values for a row), with multiple column groups, it might not result in data integrity. Thus, if two or more columns in a table must remain consistent (for example, if multiple columns are used to store address information), these columns should be placed in the same column group.

Figure 4:
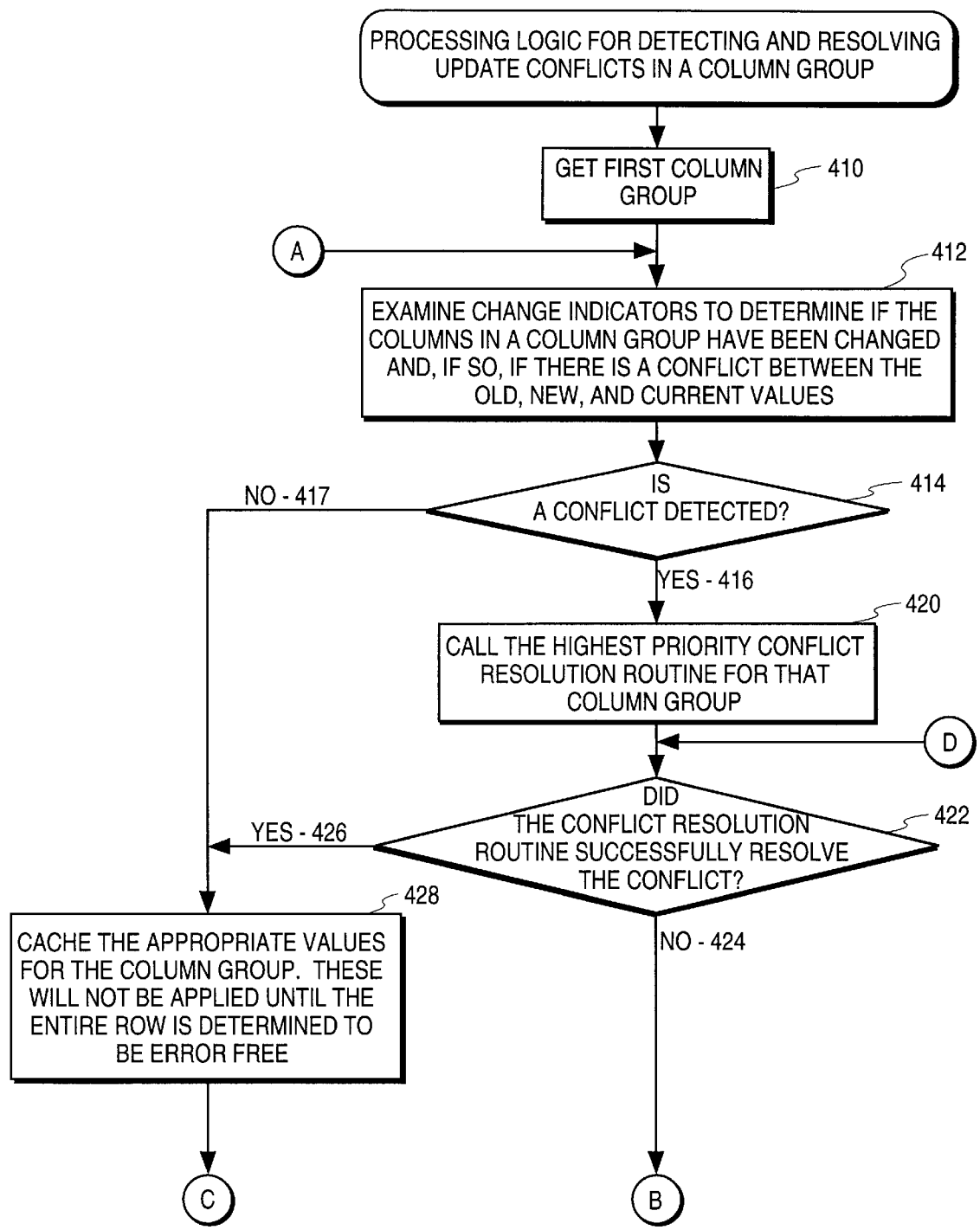
FIGS. 4 and 5 are flowcharts which illustrate the processing logic for detecting and resolving conflicts in the preferred embodiment.
Figure 5:
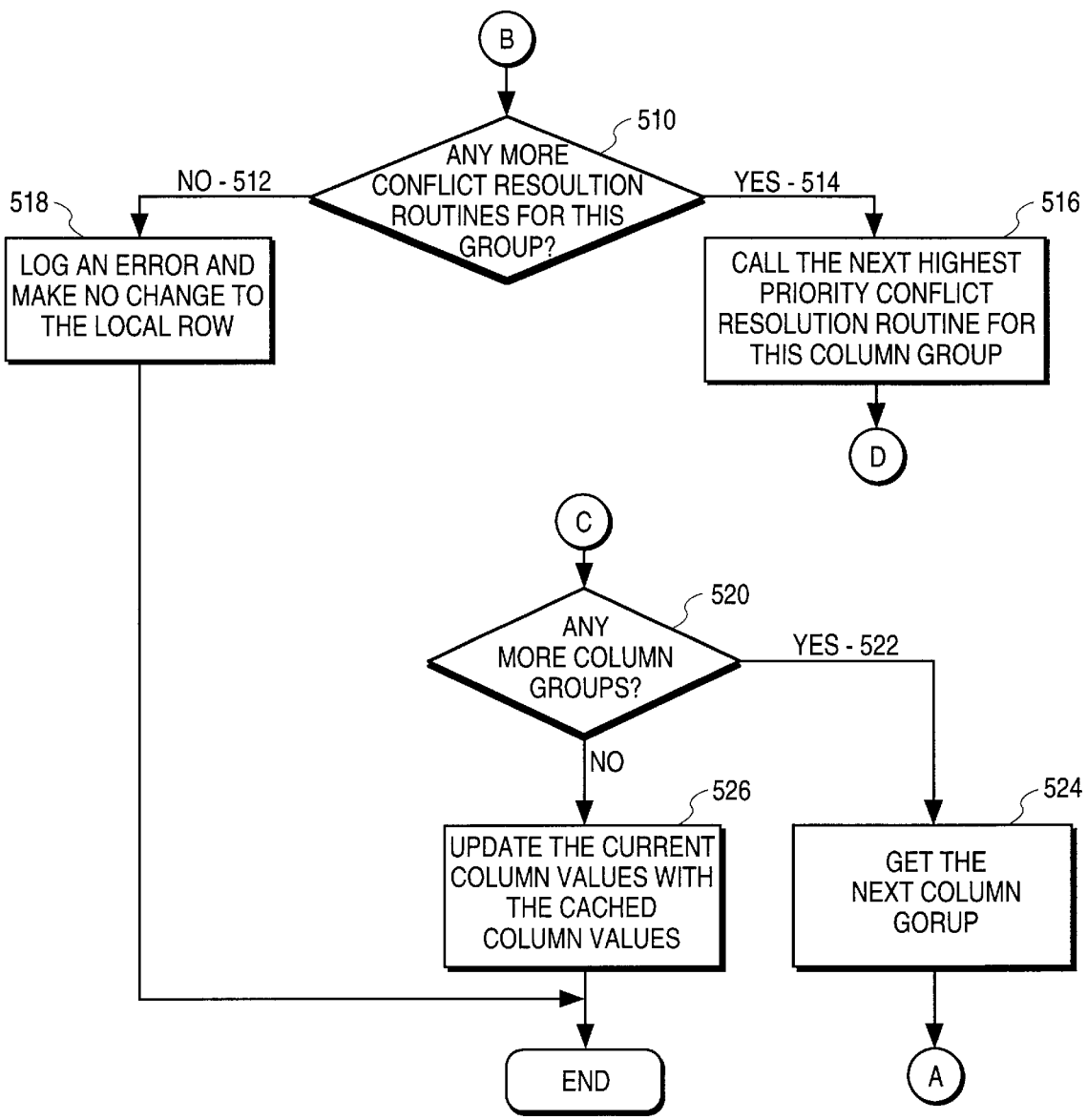

Referring now to FIGS. 4 and 5, the processing logic for detecting and resolving update conflicts in a column group is illustrated. There is a change indicator for every column group defined for a table. For every row updated, the change indicators are used to show which column groups have been updated. When an update to a row is replicated from the originating site to the receiving site, the change indicators for the row are forwarded to the receiving site. The receiving site is then able to determine which column groups in the row have been updated at the originating site (Blocks 410 and 412 in FIG. 4).

Not all old and new values of all columns in a replicated row are copied and forwarded to the receiving site. Only the old and new values of a column group that has been updated are copied and forwarded to the receiving site. However, the old primary key values for the row are always copied and forwarded to the receiving site.

At the receiving site, the old primary key values of the replicated row are used to uniquely identify the row to apply the update. If there is no row or more than one row has been identified, then an unresolvable update conflict has occurred. When an unresolvable update conflict occurs, an error is raised, and the control is returned to the transaction that replicates the row.

Once the receiving site has uniquely identified the row to apply the update, it uses the change indicators to identify the column groups that have been changed at the originating site. For those column groups whose values have been modified at the originating site, it compares the old values of each of these column groups with the current values of the same column group at the receiving site.

A column group has an update conflict if both the originating site and the receiving site have updated the column group before propagating their updates to each other. The update conflict for a column group is detected by comparing the old values from the originating site with the current values at the receiving site. If the old values do not match the current values, there is an update conflict. Conversely, if the old values match the current values, there is no update conflict (Block 414).

When there is no update conflict for a column group, the current values at the receiving site are updated with the new values from the originating site (blocks 428 and 526).

Once an update conflict has been detected for a column group (Path 416), the update conflict resolution routines that have been assigned to the column group are applied to resolve the update conflict. The conflict resolution routines are applied one by one in priority order until the conflict is resolved (Block 420 in FIG. 4 and Block 516 in FIG. 5). The conflict is resolved when one of the conflict resolution routines can determine the appropriate new values for the column group (Path 426). When the update conflict is resolved for the column group, the current values of the column grouped at the receiving site are updated with the newly determined values (blocks 428 and 526). On the other hand, if there is no conflict resolution routine assigned to the column group, or none of the assigned conflict resolution routines can resolve the update conflict (Path 512 in FIG. 5), an error is raised, and the control is returned to the transaction that replicates the row.

For optimization, the current values of all column groups at the receiving site can be updated with their new values using a single UPDATE command, instead of individual UPDATE commands from each column group. For further optimization, the receiving site does not lock the row for update that it has uniquely identified to apply the update. As a result, any local running transactions at the receiving site can potentially introduce new update conflicts while current update conflicts are being resolved. Thus, if both optimization approaches are being used, the receiving site must check for any new update conflict after it has resolved the current update conflicts.

Detecting and Resolving Uniqueness Conflicts

A database table can have one or more unique constraints. A unique constraint can be on one or more columns. A uniqueness constraint ensures that the values of those columns are unique in the database table.

When an insert of a new row is replicated from the originating site to the receiving site, the new values of all columns are copied and forwarded to the receiving site.

A uniqueness conflict occurs when a uniqueness constraint is violated during an insert or update of the replicated row at the receiving site. The uniqueness conflict is detected by comparing the new values from the originating site with the current values of all existing rows at the receiving site. The comparison is performed by each uniqueness constraint. There is a uniqueness conflict for a uniqueness constraint if there is already an existing row at the receiving site whose current values match the new values of those unique columns.

For optimization, uniqueness conflicts can be detected by trapping exceptions from the violations of unique indexes or uniqueness constraints.

Once a uniqueness conflict has been detected for a uniqueness constraint, the conflict resolution routines that have been assigned to the uniqueness constraint are applied to resolve the uniqueness conflict. The conflict resolution routines are applied one by one in priority order until the conflict is resolved. The conflict is resolved when one of the conflict resolution routines can determine the appropriate new values for the unique columns from the originating site. On the other hand, if there are no conflict resolution routines assigned to the uniqueness constraint, or none of the assigned conflict resolution routines can resolve the uniqueness conflict, an error is raised, and control is returned to the transaction that replicates the row. When all uniqueness conflicts have been resolved, the replicated row with any newly determined new column values is then applied to the database table. Any local running transactions at the receiving site can potentially introduce new uniqueness conflicts while current uniqueness conflicts are being resolved. Thus, the receiving site must check for any new uniqueness conflicts after it has resolved all the current uniqueness conflicts.

Detecting and Resolving Delete Conflicts

When the deletion of a row is replicated from the originating site to the receiving site, the old values of all columns are copied and forwarded to the receiving site.

At the receiving site, the old primary key values of the deleted row from the originating site are used to uniquely identify the row to delete. If there is no row or more than one row has been identified, then an unresolvable delete conflict has occurred. When an unresolvable delete conflict occurs, an error is raised, and control is returned to the transaction that replicates the delete.

Once the receiving site has uniquely identified the row to delete, it compares the old values of the deleted row with the current values of the selected row. If the old values match the current values, the selected row is deleted from the receiving site. On the other hand, if the old values do not match the current values, a delete conflict is detected.

Once a delete conflict has been detected for a database table, the delete conflict resolution routines that have been assigned to the database table are applied to resolve the delete conflict. The conflict resolution routines are applied one by one in priority order until the conflict is resolved. If there is no delete conflict resolution routine, or none of the assigned delete conflict resolution routines can resolve the delete conflict, an error is raised, and control is returned to the transaction that replicates the delete. Any local running transactions at the receiving site can potentially introduce a new delete conflict while the current delete conflict is being resolved. Thus, the receiving site must check for any new delete conflict after it has resolved the current delete conflict.

Declarative Conflict Resolution Methods

The present invention provides various declarative conflict resolution methods for each type of conflict. The user can choose and declare one or more conflict resolution methods to be used for each possible conflict. The user can also declare the priority order of applying the resolution methods when there is more than one resolution method for a possible conflict.

The standard declarative conflict resolution methods that are provided by the present invention for each type of conflict are described in the following sections. It will be apparent to one of ordinary skill in the art that other conflict resolution methods for each type of conflict may be equivalently defined.

One of the standard declarative conflict resolution methods is the "User Function" method. The "User Function" method provides user extensibility to standard conflict resolution routines that are provided by the present invention for update conflicts, uniqueness conflicts and delete conflicts. The user can write their own conflict resolution routines and use them together with the standard conflict resolution routines. When the user wants to use a user-defined conflict resolution routine for a possible conflict, they declare a "User Function" method for the possible conflict and specify the user-defined conflict resolution routine as the User Function.

The "User Function" method can also be used by the user to do other useful tasks such as sending out notifications when a conflict cannot be resolved. The user writes a notification routine and registers it as the User Function for the "User Function" method.

The standard conflict resolution routines do not support all cases in the preferred embodiment. For example, they do not support the following situations: 1) delete conflicts, 2) changes to a primary key, 3) NULLs or undefined values in the columns designated to be used to resolve the conflict, or 4) referential integrity constraint violations. For these situations, users must write their own conflict resolution routines, or define a method of resolving the conflicts after the errors have been raised and logged in some error tables.

Standard Resolution Methods for Update Conflicts

The preferred embodiment provides the following methods of resolving update conflicts in replicated environments with any number of master sites. It will be apparent to those of ordinary skill in the art that other update conflict methods are suggested by this disclosure of the present invention. The methods are: 1) apply the data with the latest timestamp, 2) apply all data additively, 3) apply the minimum value, when the column value is always decreasing, and 4) apply the maximum value, when the column value is always increasing.

There are several additional methods provided that can be used to resolve conflicts in replicated environments with no more than two master sites: 1) apply the data with the earliest timestamp, 2) apply the minimum value, 3) apply the maximum value, 4) apply the value from the site with the highest priority, and 5) apply the value assigned the highest priority.

There are several methods that can be used to resolve conflicts in replicated environment with only one master site and multiple updatable snapshot sites: 1) average the values, 2) discard the values from the snapshot sites, or 3) overwrite the values at the master sites.

Finally, there is the "User Function" method that the user uses to resolve an update conflict with a user-defined conflict resolution routine. These methods are described in more detail below.

Standard Resolution Methods for Unique Constraint Conflicts

The preferred embodiment provides a variety of methods for resolving uniqueness conflicts: 1) append the global name of the originating site to the column value, 2) append a generated sequence number to the column value, or 3) discard the new transaction from the remote site.

If there is more than one master site, none of these routines result in convergence and they should only be used with some form of notification facility.

There is the "User Function" method that the user can use to resolve a uniqueness conflict with a user-defined conflict resolution routine.

Standard Resolution Method for Delete Conflicts

The preferred embodiment provides one standard resolution method for resolving delete conflicts, which is the "User Function" method. Although the present invention has not provided any standard conflict resolution routine for a delete conflict, the delete conflict can still be detected, and resolved with a user-defined conflict resolution routine. The "User Function" method allows the user to register a user-defined conflict resolution routine for a potential delete conflict.

Avoiding Ordering Conflicts

As the above list indicates, many forms of conflict resolution cannot guarantee convergence if the replicated environment contains more than two masters. As shown in FIG. 6, network failures and infrequent pushing of the deferred remote procedure call queue increase the chance of non-convergence when there are more than two masters.

In the example shown in FIG. 6, changes made at site A are given priority over conflicting changes at site B, and changes from site B have priority over changes from site C. FIG. 6 illustrates the actions that may occur over the course of the day in a replicated environment that may lead to the inability of the multiple sites to make conflicts converge.

These types of ordering conflicts can be avoided when using priority groups if it is required that the flow of ownership be ordered, as it is in the work flow model. That is, information must always flow from the ORDER site to the SHIP site to the BILL site, in a typical business example. If the billing site receives a change to a row from the ordering site after it has already received a change to that row from the shipping site, for example, the billing site will know to ignore the out-of-order change from the ordering site.

Summary of Standard Conflict Resolution Methods

FIG. 7 summarizes the standard conflict resolution methods provided in the preferred embodiment of the present invention. This figure also shows if these resolution methods can guarantee convergence (all sites ultimately agreeing on the same value) between multiple master sites and their associated snapshot sites. Each of these methods is explained in greater detail in the following sections.

Minimum and Maximum Update Conflict Methods

When the present invention detects a conflict with a column group and calls the minimum value conflict resolution routine, the processing logic compares the new value from the originating site with the current value at the receiving site for a designated column in the column group. This column must be designated when the minimum value conflict resolution method is selected.

If the two values for the designated column are the same or one of the two values is undefined, that is, NULL (for example, if the designated column was not the column causing the conflict), the conflict is not resolved, and the values of the columns in the column group remain unchanged. If the new value of the designated column is less than the current value, the column group values from the originating site are applied at the receiving site. If the new value of the designated column is greater than the current value, the conflict is resolved by leaving the current column group values unchanged. The maximum value method works exactly the same as the minimum value method, except that the values from the originating site are only applied if the value of the designated column at the originating site is greater than the value of the designated column at the receiving site.

There are no restrictions on the datatypes of the columns in the column group. For minimum value, convergence for more than two master sites is only guaranteed if the value of the designated column is always decreasing. For maximum value, the column value must always be increasing.

Earliest and Latest Timestamp Update Conflict Resolution Methods

The earliest and latest timestamp methods are simply variations on the minimum and maximum value methods. For the timestamp method, the designated column must be of the well known type DATE. Whenever any column in a column group is updated, a conventional application updates the value of this timestamp column with the local SYSTEM DATE (SYSDATE). For a change that is applied from another site, the timestamp value should be set to the timestamp value from the originating site.

For example, suppose that a customer calls his local sales representative to update his address information. After hanging up the phone, he realizes that he gave the wrong zip code. When he tries to call his sales representative with the correct zip code, he discovers that the phone lines in that area have gone down, so he calls the headquarters number instead, to update his address information again. When the network connecting the headquarters site with the sales site comes back up, the present invention will see two updates for the same address, and detect a conflict. By using the latest timestamp method, the present invention would select the later update, and apply the address with the correct zip code. If the replicated environment crosses time zones, all timestamps should be converted to a common time zone. Otherwise, although the data will converge, the most recent update may not be applied as expected.

The earliest timestamp method applies the changes from the site with the earliest timestamp, and the latest timestamp method applies the changes from the site with the latest timestamp. A backup method, such as site priority, should be designated to be called in case two sites have the same timestamp. The timestamping mechanism should be designed to be time zone independent (for example, by always converting the timestamp to a designated time zone, such as GMT).

Because the maximum value method can guarantee convergence if the value is always increasing, the latest timestamp method can guarantee convergence (assuming that you have properly designed your timestamping mechanism). The earliest timestamp method cannot guarantee convergence for more than two masters (since time is generally not always decreasing).

The earliest and latest timestamp methods require auditing of update timestamps. Users specify whether the present invention automatically audits update timestamps or whether an application explicitly audits update timestamps. If the application audits update timestamps, users must specify which column in the column group stores the last update timestamp. The datatype of the column must be of date.

The auditing column stores the last update timestamp of any column in the column group. The auditing column always stores the timestamp when the column value(s) were first created. For example, if the earliest change is from a remote site, this method results in overwriting the current column value with the replicated column value from the remote site, and updating the auditing column with the timestamp when the replicated column value was first created, that is, from the remote site.

Additive and Average Update Conflict Resolution Methods

The additive and average conflict resolution routines work with column groups consisting of a single numeric column only. The additive routine adds the difference between the old and new values at the originating site to the current value at the receiving site as follows:

current value=current value+(new value−old value)

The additive conflict resolution method provides convergence for any number of master sites.

The average conflict resolution method averages the new column value from the originating site with the current value at the receiving site as follows:

current value=(current value+new value)/2

The average method cannot guarantee convergence if the replicated environment has more than one master. This method is useful for an environment with a single master site and multiple updatable snapshots.

Priority Group and Site Priority Update Conflict Resolution Methods

Priority groups allow a user to assign a priority level to each possible value of a particular column. As shown in the example illustrated in FIGS. 8 and 9, a Priority view 910 shows the priority level 914 assigned to each value 916 that the "priority" column can contain. A priority level for all possible values of the "priority" column must be specified.

When the priority group method of conflict resolution is selected for a column group, the user designates which column in the column group is the "priority" column. When the priority group conflict resolution routine is invoked to resolve an update conflict in a column group, the processing logic compares the priority level of the new value from the originating site with that of the current value at the receiving site for the designated "priority" column in the column group.

If the two priority levels are the same, or one of them is undefined, the conflict is not resolved, and the current column group values at the receiving site remain unchanged.

If the priority level of the new value in the designated "priority" column is greater than that of the current value at the receiving site, the current column group values at the receiving site are updated with the new column group values from the originating site. Conversely, if the priority level of the new value in the designated "priority" column is less than that of the current value at the receiving site, the conflict is resolved by leaving the current column group values at the receiving site unchanged.

It will be apparent to one of ordinary skill in the art that the priority group conflict resolution routine may equivalently interpret that a lower priority level takes precedence over a higher priority level.

The Priority view 910 displays the values of all priority groups 912 defined at the current location. In the example shown in FIG. 8, there are two different priority groups, "site-priority" and "order-status". The CREDIT_STATUS table 920 is shown in FIG. 9 as using the "site-priority" priority group 912; because the site values 918 in the CREDIT_STATUS table 920 correspond to the "site-priority" values 916 shown in FIG. 8.

Site priority is a special kind of priority group. With site priority, the "priority" column designated is automatically updated with the global database name of the site where the update originated. The Priority view 910 in FIG. 8 shows the priority level 914 assigned to each database site 916. Site priority can be useful if one site is considered to be more likely to have the most accurate information. For example, in FIGS. 8 and 9, the Houston site (houston.world) may be the corporate headquarters, while the New York site (new_york.world) may be a sales office. The headquarters office (houston.world), in this example, is considered more likely to have the most accurate information about the credit that can be extended to each customer. Thus, the headquarters office (houston.world) priority is set higher ("1") than the sales office (new_york.world) priority ("2").

When using site priority, convergence with more than two masters is not guaranteed. You can guarantee convergence with more than two masters when you are using priority groups, however, if the value of the "priority" column is always increasing. That is, the values in the priority column correspond to an ordered sequence of events; for example: ordered, shipped, billed.

The site priority method requires auditing of the global name of the site that applied the last update. Users specify whether the present invention or an application maintains the audit information. If the application maintains the audit information, users must specify which column in the column group stores the site global name. The column specified always stores the global name of the site where the column value(s) were first created.

Overwrite and Discard Update Conflict Resolution Methods.

The overwrite and discard methods ignore the values from either the originating or receiving site and therefore can never guarantee convergence with more than one master site. These methods are designed to be used by a single master site and multiple snapshot sites, or with some form of a user-defined notification facility. For example, if you have a single master site that you expect to be used primarily for queries, with all updates being performed at the snapshot sites, you might select the overwrite method. These methods are also useful if your primary concern is data convergence (and you have a single master site), and there is no particular business rule for selecting one update over the other. You may even choose to use one of these methods if you have multiple master sites, provided that you supply a notification facility. This allows you to notify the appropriated personnel, who will be responsible for ensuring that the data is correctly applied, instead of logging the conflict in the some error tables and leaving the resolution up of a local database administrator.

The overwrite routine overwrites the current value at the receiving site with the new value from the originating site. Conversely, the discard method discards the new value from the originating site.

Append Site Name/Append Sequence Uniqueness Conflict Resolution Methods

The append site name and append sequence conflict resolution routines work by appending a string to a column whose unique constraint has been violated, that is, duplicate column values have been detected. If the unique constraint is on more than one column, the user must specify one of the columns as the column to which the string is appended. Although this allows the column to be inserted or updated without violating a unique integrity constraint, it does not provide any form of convergence between multiple master sites. The resulting discrepancies must be manually resolved; therefore, these methods are meant to be used with some form of a notification facility. Both methods can be used on character columns only in the preferred embodiment.

These methods can be useful when the availability of the data may be more important than the complete accuracy of the data. By selecting one of these methods, used with a notification scheme, instead of logging a conflict, you allow the data to become available as soon as it is replicated. By notifying the appropriate personnel, you ensure that the most knowledgeable person resolves the duplication.

When a uniqueness conflict is encountered, the append site name routine appends the global database name of the site originating the transaction to the new column value from the originating site. Similarly, the append sequence routine appends a generated sequence number to the new column value from the originating site.

Discard Uniqueness Conflict Resolution Method

This conflict resolution routine resolves uniqueness conflicts by simply discarding the row from the originating site. This method never guarantees convergence with multiple masters and should be used with a notification facility.

Compared to the append methods, this method is useful if you want to minimize the propagation of data until its accuracy can be verified.

User Function Update Conflict Resolution Method

Users can also create their own specific conflict resolution functions. Configurable conflict resolution allows users to freely mix their own functions with the standard conflict resolution routines that are provided by the present invention.

The present invention does not impose any restrictions on user functions. But, it requires that user functions adhere to the following interface specification in the preferred embodiment:

The user conflict resolution function should return TRUE if it has successfully resolved the conflict.

The user function should return FALSE if it has not successfully resolved the conflict.

The user function should accept column values as parameters.

The user function should accept old, new and current columns values. The old, new and current values for a column are received consecutively. If it can resolve the conflict, it modifies only the new column values so that the replication procedure can update the current row with the new column values.

Parameters that accept new column values should use IN OUT parameter mode. Others should use IN parameter mode.

The last parameter of the function must be a boolean flag. The function sets the flag to TRUE if it wants to discard the new column values; otherwise it sets the flag to FALSE.

Users specify which columns in the table constitute the parameters for each user function.

Users should avoid using the following commands in their conflict resolution functions. While configurable conflict resolution does not prohibit these commands, the outcome of replication becomes unpredictable if user functions use them. User functions should avoid the following:

Data Definition Language commands

Transaction Control commands

Session Control commands

System Control commands

Note that any transaction or data change made by the user function will not automatically be replicated.

User Function Uniqueness Conflict Resolution Method

Users can create their own conflict resolution functions. Configurable conflict resolution allows users to freely mix their own functions with the standard conflict resolution routines that are provided by the present invention.

The present invention does not impose any restrictions on user functions. But, it requires that user functions adhere to the following interface specification:

The function should return TRUE if it has successfully resolved the conflict.

The function should return FALSE if it has not successfully resolved the conflict.

The function should have all parameters with IN OUT mode.

The function should accept column values as parameters.

The function should accept new column values. If it can resolve the conflict, it modifies the new column values so that the replication procedure can insert or update the current row with the new column values.

The last parameter of the function must be a boolean flag. The function sets the flag to TRUE if it wants to discard the new column values; otherwise it sets the flag to FALSE.

Users specify which columns in the table constitute the parameters for each user function.

Users should avoid using the following commands in their conflict resolution functions. While automatic conflict resolution does not prohibit these commands, the outcome of replication becomes unpredictable if user functions use them. User functions should avoid the following:

Data Definition Language commands

Transaction Control commands

Session Control commands

System Control commands

Note that any transaction or data change made by the user function will not automatically be replicated.

User Function Delete Conflict Resolution Method

Users can create their own conflict resolution functions. Configurable conflict resolution allows users to freely mix their own functions.

The present invention does not impose any restrictions on user functions. But, it requires that user functions adhere to the following interface specification:

The function should return TRUE if it has successfully resolved the conflict.

The function should return FALSE if it has not successfully resolved the conflict.

The function should have all parameters with IN OUT mode.

The function should accept column values as parameters.

The function should accept old column values. If it can resolve the conflict, it modifies the old column values so that the replication procedure can delete the current row that matches all old column values.

The last parameter of the function must be a boolean flag. The function sets the flag to TRUE if it wants to discard the old column values; otherwise it sets the flag to FALSE.

Users specify which columns in the table constitute the parameters for each user function.

Users should avoid using the following commands in their conflict resolution functions. While automatic conflict resolution does not prohibit these commands, the outcome of replication becomes unpredictable if user functions use them. User functions should avoid the following:

Data Definition Language commands

Transaction Control commands

Session Control commands

System Control commands

Note that any transaction or data changes made by the user function will not automatically be replicated.

Conflict Resolution Processing

The following is an example illustrating the preferred embodiment of the present invention. This example is a demonstration of the process of resolving both update and uniqueness conflicts that can occur for an update of a row.

Referring to FIGS. 11–14, flowcharts illustrate the logic steps performed by the processing logic of the present invention for resolving conflicts. FIGS. 15–21 are flowcharts illustrating the logic steps performed by the processing logic of the present invention for resolving conflicts with the automatic generation of audit information. These flowcharts describe a transaction between two sites (Master site I and Master site II) and illustrate the conflict resolution features of the present invention. These flowcharts are described in detail below.

Figure 11:
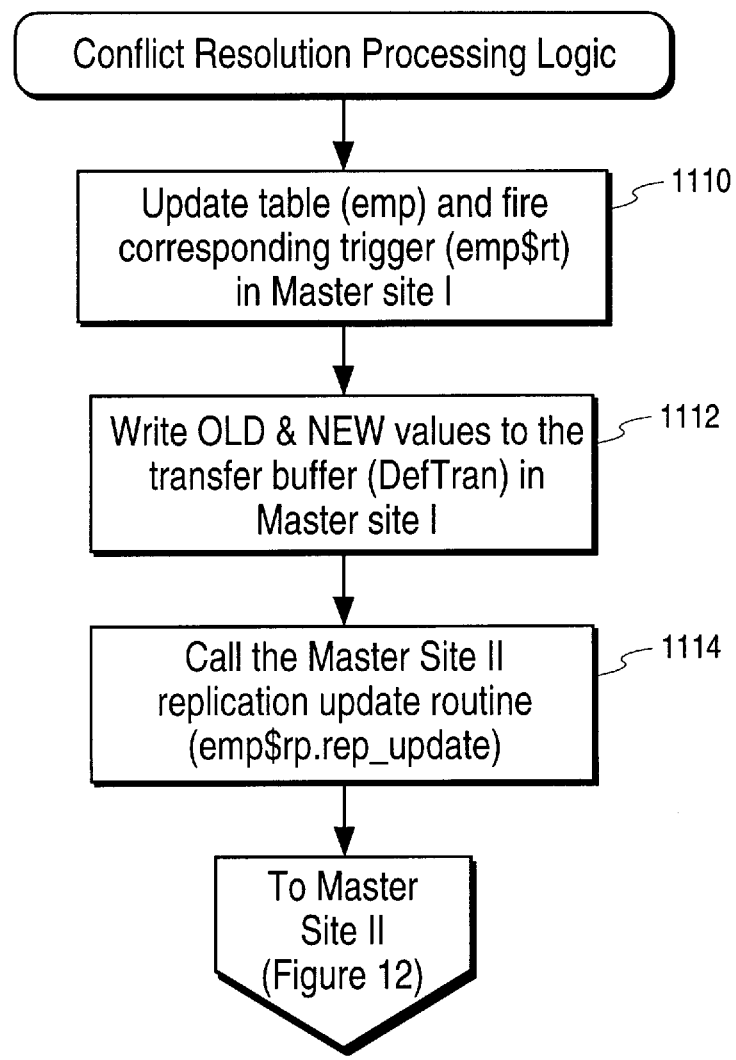
FIGS. 11–21 are flowcharts which illustrate the processing logic for detecting and resolving conflicts in the preferred embodiment.

Referring to FIG. 11, a table (called "emp" in this example) is updated in the first site or Master site I (block 1110). A corresponding trigger (emp$rt) is fired when the table is updated. The OLD and NEW values (values prior to the update and values subsequent to the update, respectively) of the table are written to a transfer buffer (DefTran) in the Master site I in block 1112. A Master Site II replication update routine (emp$rp.rep_update) is called in block 1114 and processing for Master site I ends in FIG. 11. The perspective of this description then shifts to the point of view of the Master site II as shown starting in FIG. 12.

Figure 12:
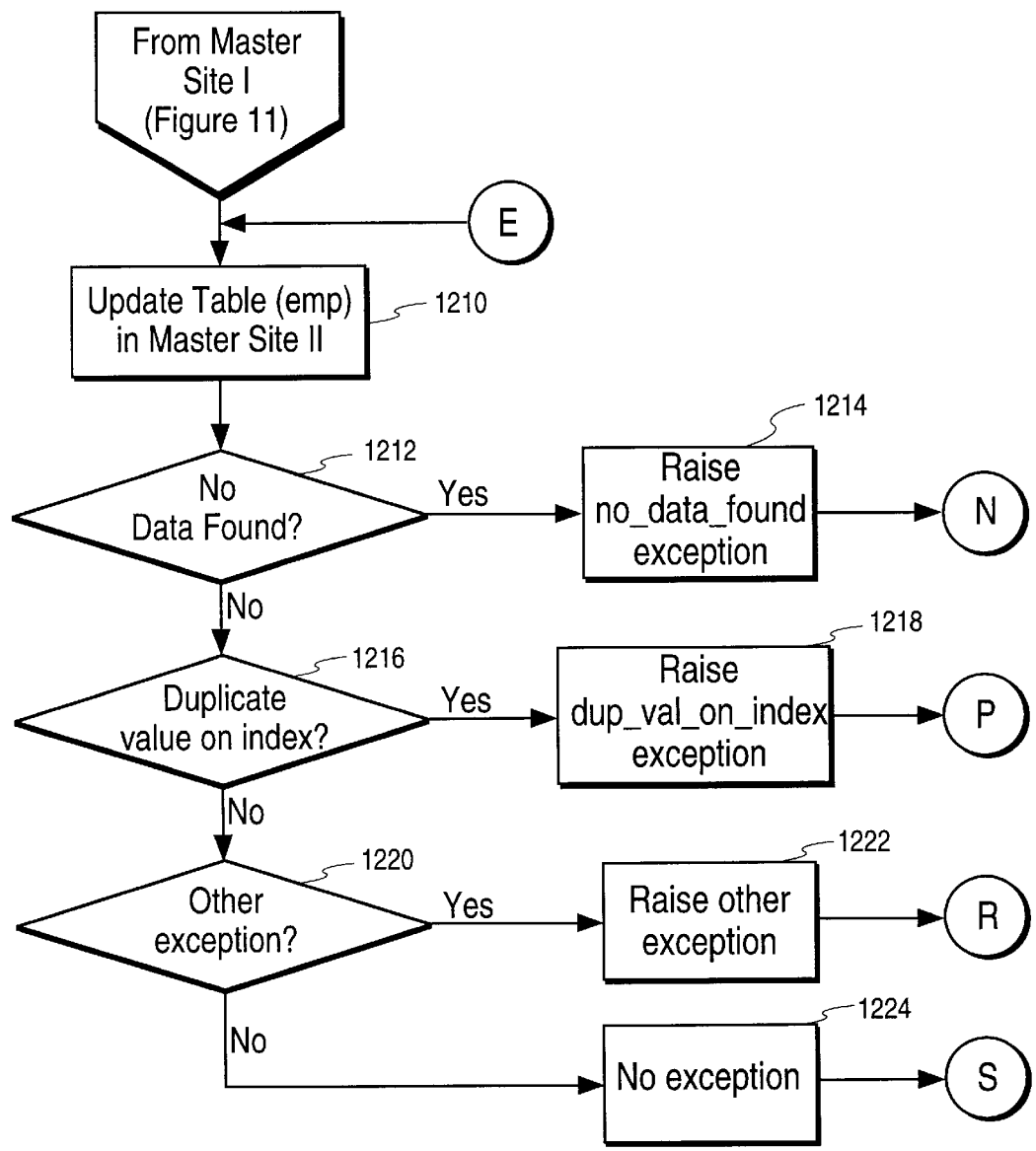

Referring now to FIG. 12, the "emp" table in Master site II is updated in block 1210. The "emp" table in each of the Master sites I and II are replicated copies of each other that may be updated independently at each site where it resides. After the table is updated in block 1210, a series of tests are executed to determine if the update caused any conflicts. First, a test is performed to determine if an update conflict is present. If so, the no_data_found exception is raised in block 1214 and processing continues at the bubble labeled N shown in FIG. 13. If a uniqueness conflict occurred, the dup_val_on_index exception is raised in block 1218 and processing continues at the bubble labeled P shown in FIG. 14. If some other exception occurred, the other exception is raised in block 1222 and processing continues at the bubble labeled R shown in FIG. 13. If no exception is detected, processing continues at the bubble labeled S shown in FIG. 13.

Figure 13:
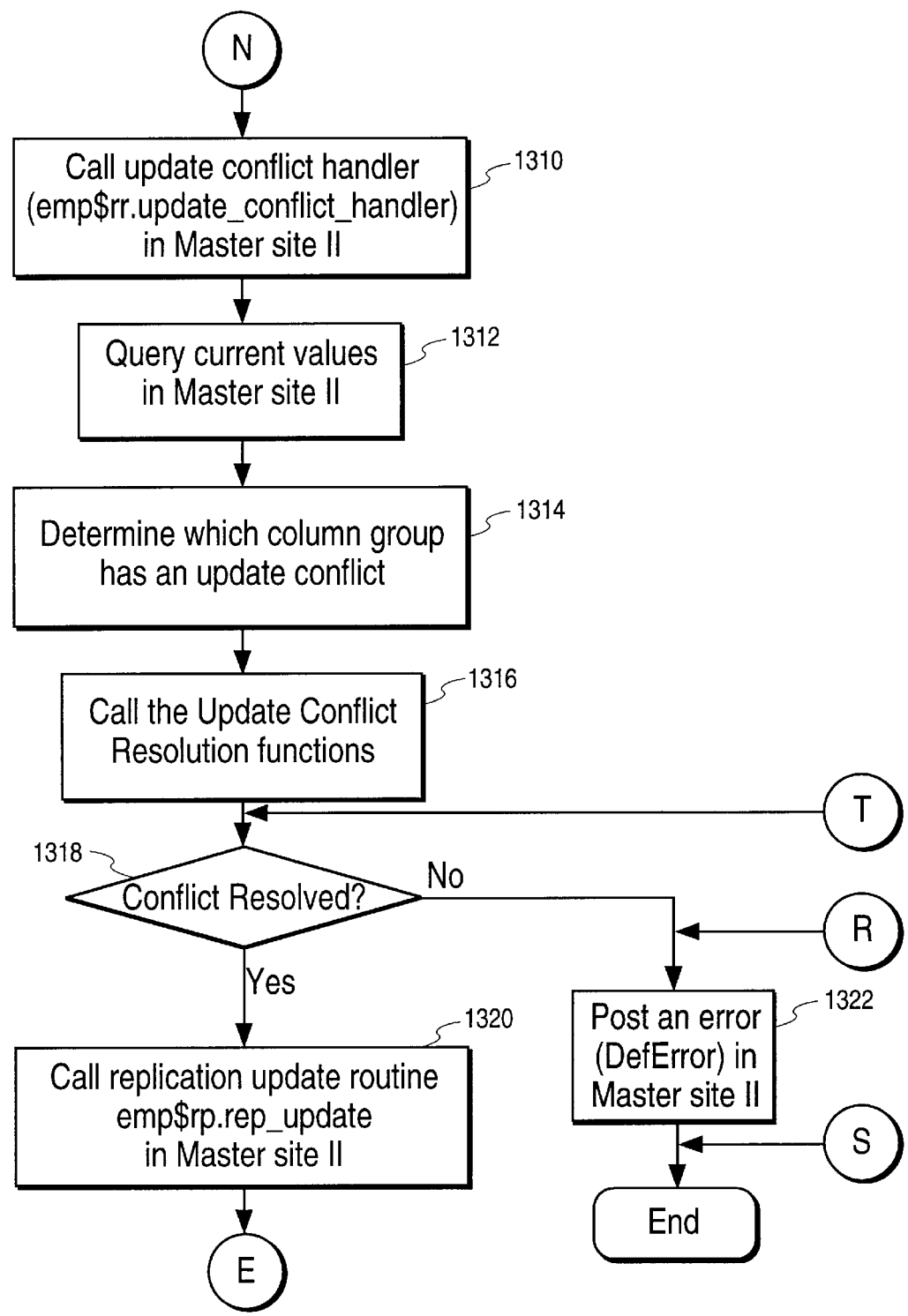

Referring now to FIG. 13, the processing performed when an update conflict is detected is shown. This processing implements the logic for detecting and resolving conflicts shown in FIGS. 4 and 5, which are described above. Referring again to FIG. 13, an update conflict handler (emp$rr.update_conflict_handler in this example) is called in the Master site II in block 1310. The current table values in Master site II are queried in block 1312. The column groups are tested to determine which column group has an update conflict in block 1314. The corresponding update conflict resolution routine(s) are called in block 1316. If the update conflict is resolved, block 1320 in Master site II is executed to call the replication update routine emp$rp.rep_update in this example. Processing then continues at the bubble labeled E shown in FIG. 12 where the emp table is again recursively checked for update conflicts. If in block 1318 the update conflict is not resolved, an error is posted in block 1322 and processing terminates at the End bubble shown in FIG. 13.

Figure 14:
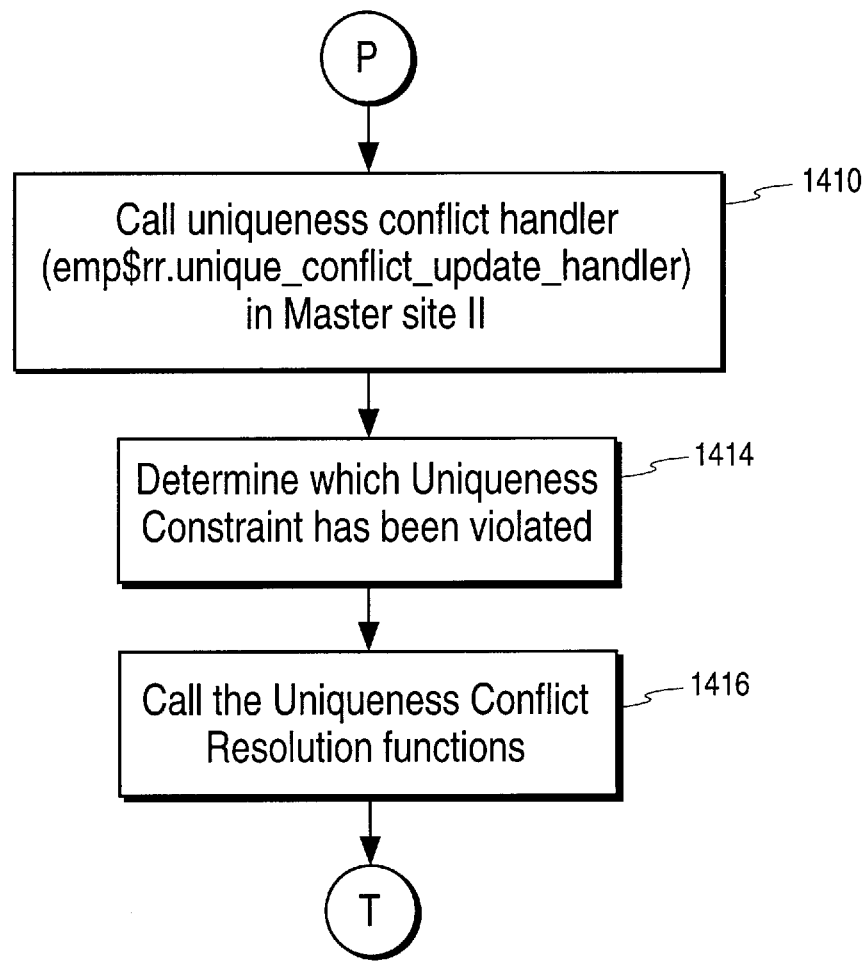

Referring now to FIG. 14, the processing performed when a uniqueness conflict is detected is shown. First, a uniqueness conflict handler (emp$rr.unique_conflict_update_handler in this example) is called in the Master site II in block 1410. The uniqueness constraint that was violated is determined in block 1414. The corresponding uniqueness conflict resolution routine(s) are called in block 1416. Processing continues at the bubble labeled T shown in FIG. 13 where a test is executed to determine if the uniqueness conflict was resolved.

Figure 15:
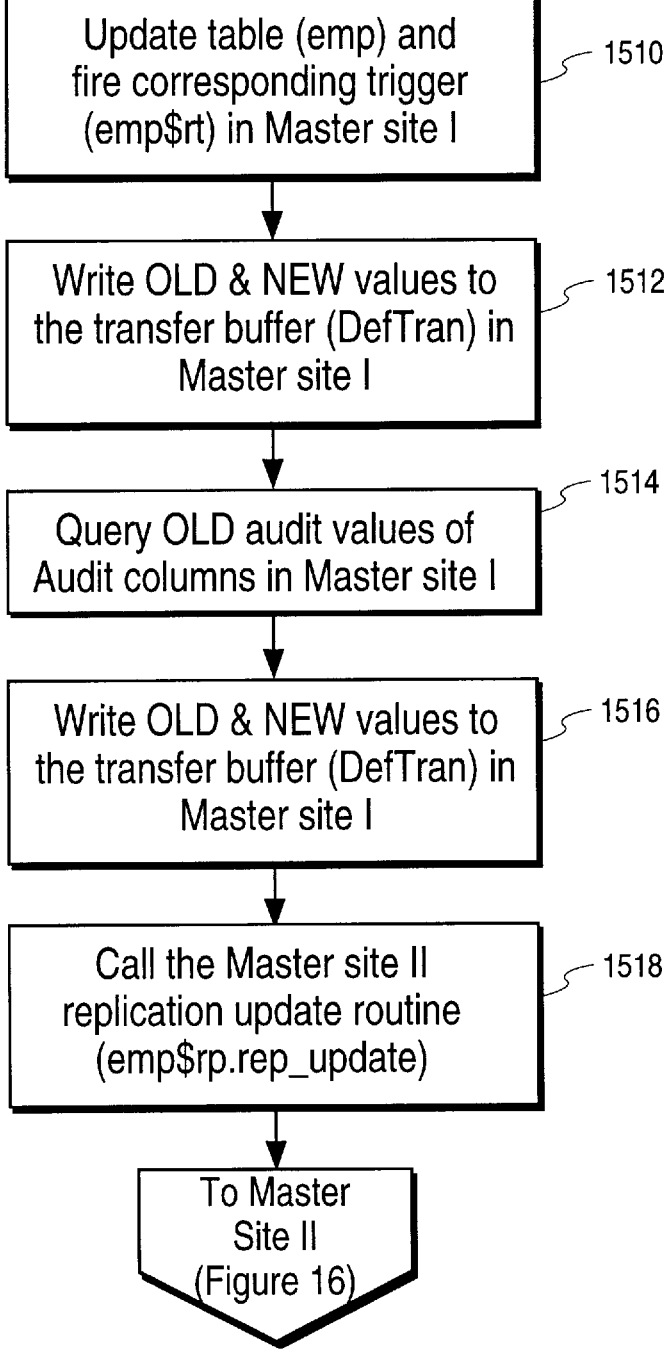

FIGS. 15–21 are flowcharts illustrating the logic steps performed by the processing logic of the present invention for resolving conflicts with the automatic generation of audit information. Referring to FIG. 15, a table (called "emp" in this example) is updated in Master site I (block 1510). A corresponding trigger (emp$rt) is fired when the table is updated. The OLD and NEW values of the table are written to a transfer buffer (DefTran) in the Master site I in block 1512. Audit columns of the table (emp) are queried for the OLD audit values (block 1514). The OLD audit values and NEW audit values are written to the transfer buffer DefTran in block 1516. A Master Site II replication update routine (emp$rp.rep_update) is called in block 1518 and processing for Master site I ends in FIG. 15. The perspective of this description then shifts to the point of view of the Master site II for the automatic generation of audit information as shown starting in FIG. 16.

Figure 16:
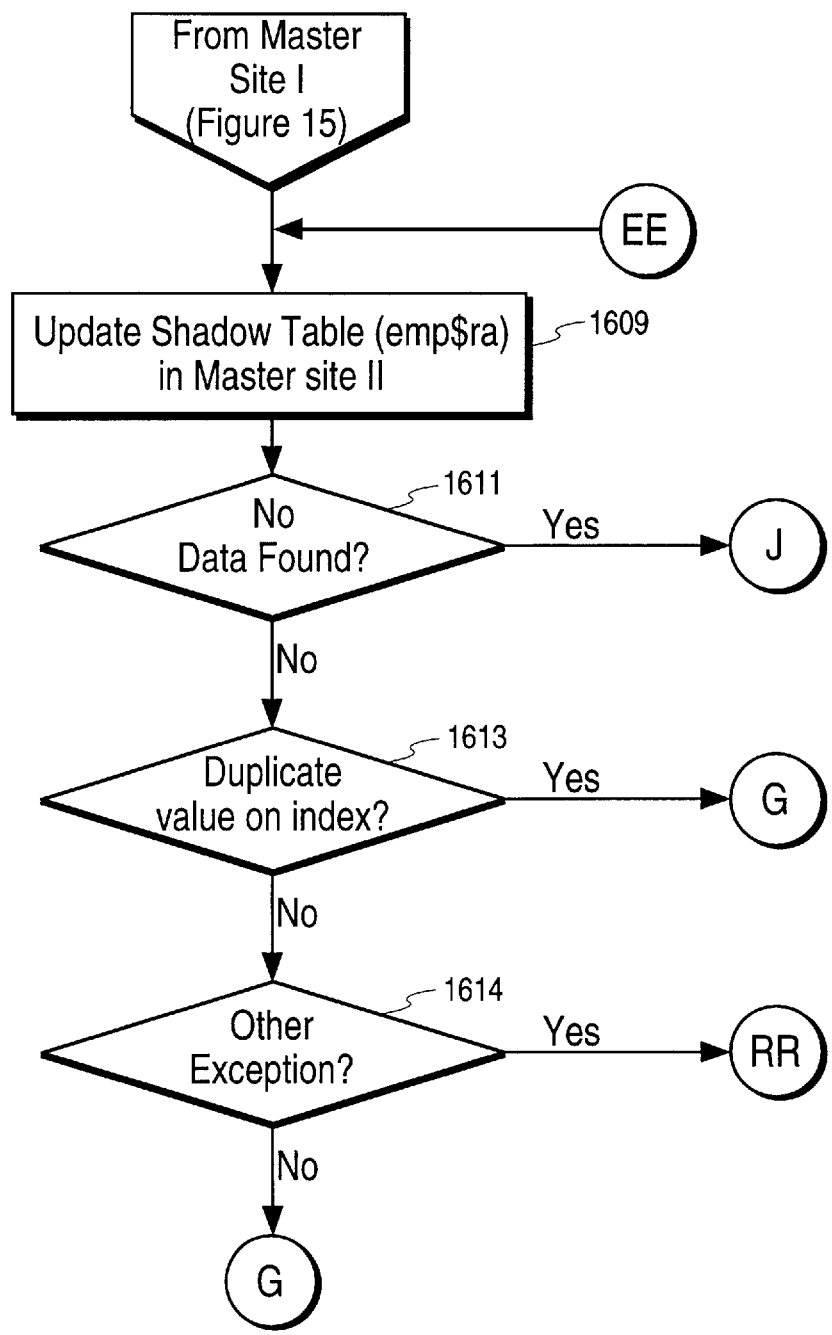

Referring now to FIG. 16, a shadow table (emp$ra) corresponding to the emp table is updated in the Master site II in block 1609. If an update conflict (block 1611) is found, processing continues at the bubble labeled J shown in FIG. 18. If a uniqueness conflict (block 1613) in the shadow table is found, processing continues at the bubble labeled G shown in FIG. 17 where the emp table is checked for conflicts. If another exception is found (block 1614), processing continues at the bubble RR shown in FIG. 20. Otherwise, processing continues at bubble G shown in FIG. 17.

Figure 17:
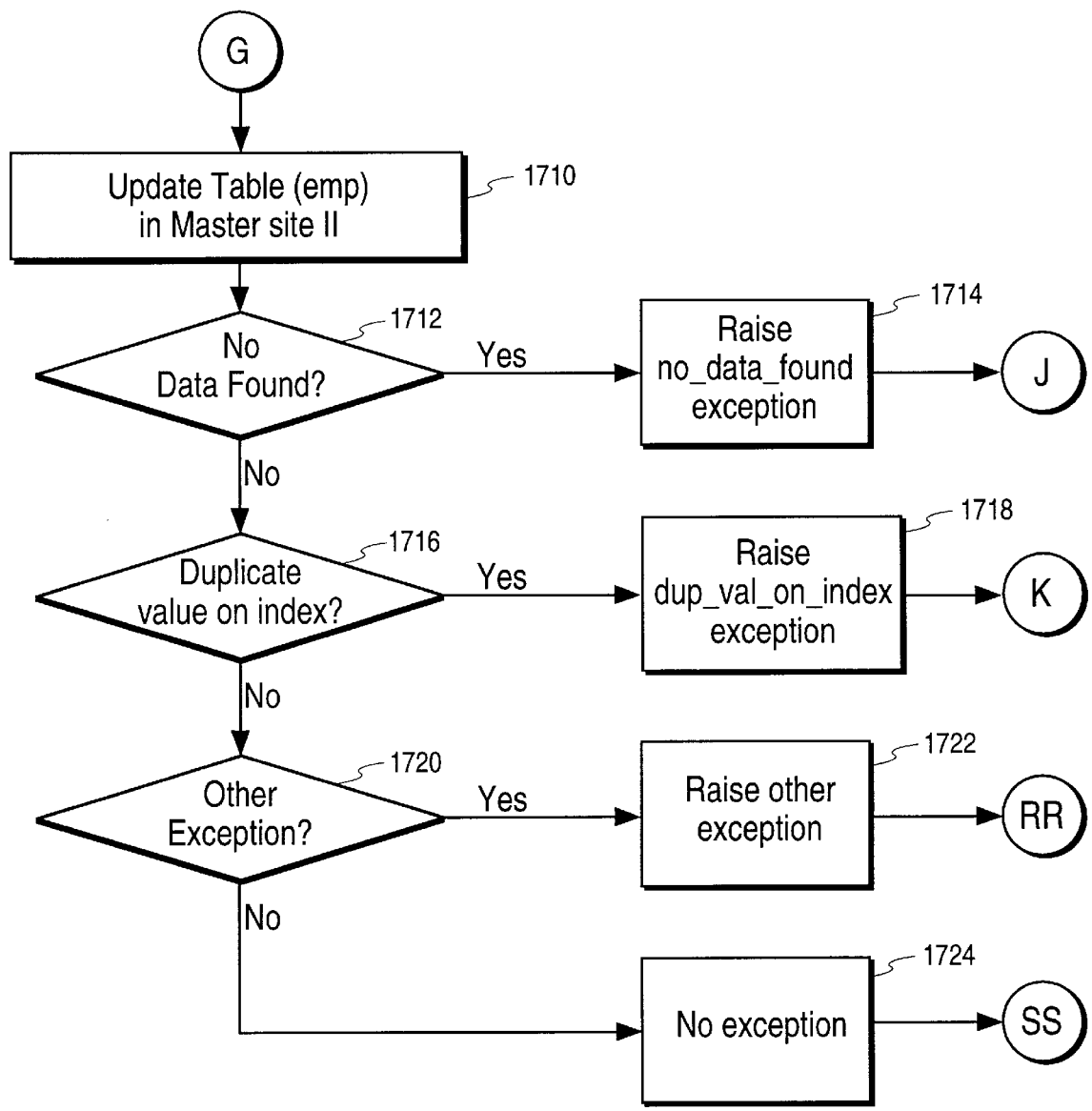

Referring now to FIG. 17, the table ("emp" in this example) is checked for conflicts. The "emp" table in Master site II is updated in block 1710. After the table is updated in block 1710, a series of tests are executed to determine if the update caused any conflicts. First, a test is performed to determine if an update conflict is present. If so, the no_data_found exception is raised in block 1714 and processing continues at the bubble labeled J shown in FIG. 18. If a uniqueness conflict occurred, the dup_val_on_index exception is raised in block 1718 and processing continues at the bubble labeled K shown in FIG. 19. If some other exception occurred, the other exception is raised in block 1722 and processing continues at the bubble labeled RR shown in FIG. 20. If no exception is detected, processing continues at the bubble labeled SS shown in FIG. 20.

Figure 18:
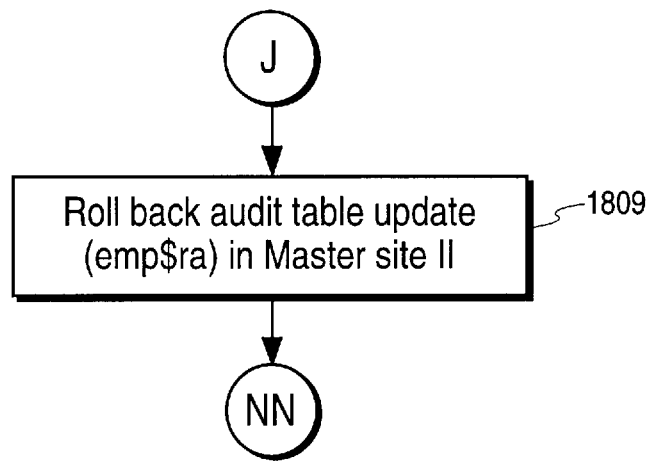

Referring now to FIG. 18, the processing performed when an update conflict is detected in the audit context is shown. First, the update to the audit table (emp$ra) is rolled back in block 1809. Next, processing then continues at the bubble labeled NN shown in FIG. 20 where the emp table is processed for update conflicts.

Figure 19:
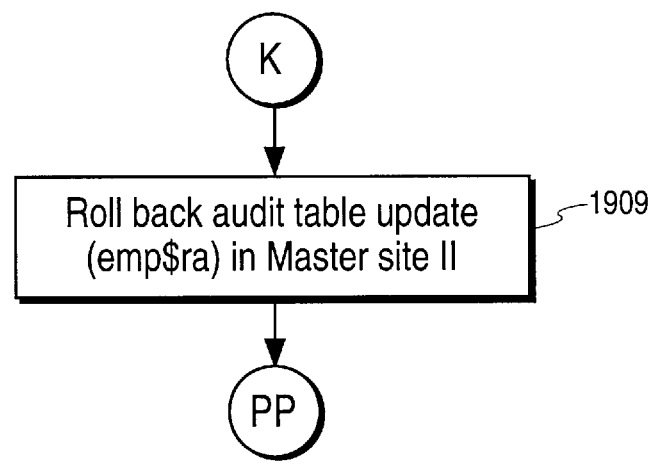

Referring now to FIG. 19, the processing performed when a uniqueness conflict is detected in the audit context is shown. First, the update to the audit table (emp$ra) is rolled back in block 1909. Next, processing then continues at the bubble labeled PP shown in FIG. 21 where the emp table is processed for uniqueness conflicts. Once the conflict is resolved or the determination is made that the conflict cannot be resolved, processing is terminated as shown in FIG. 20.

Figure 20:
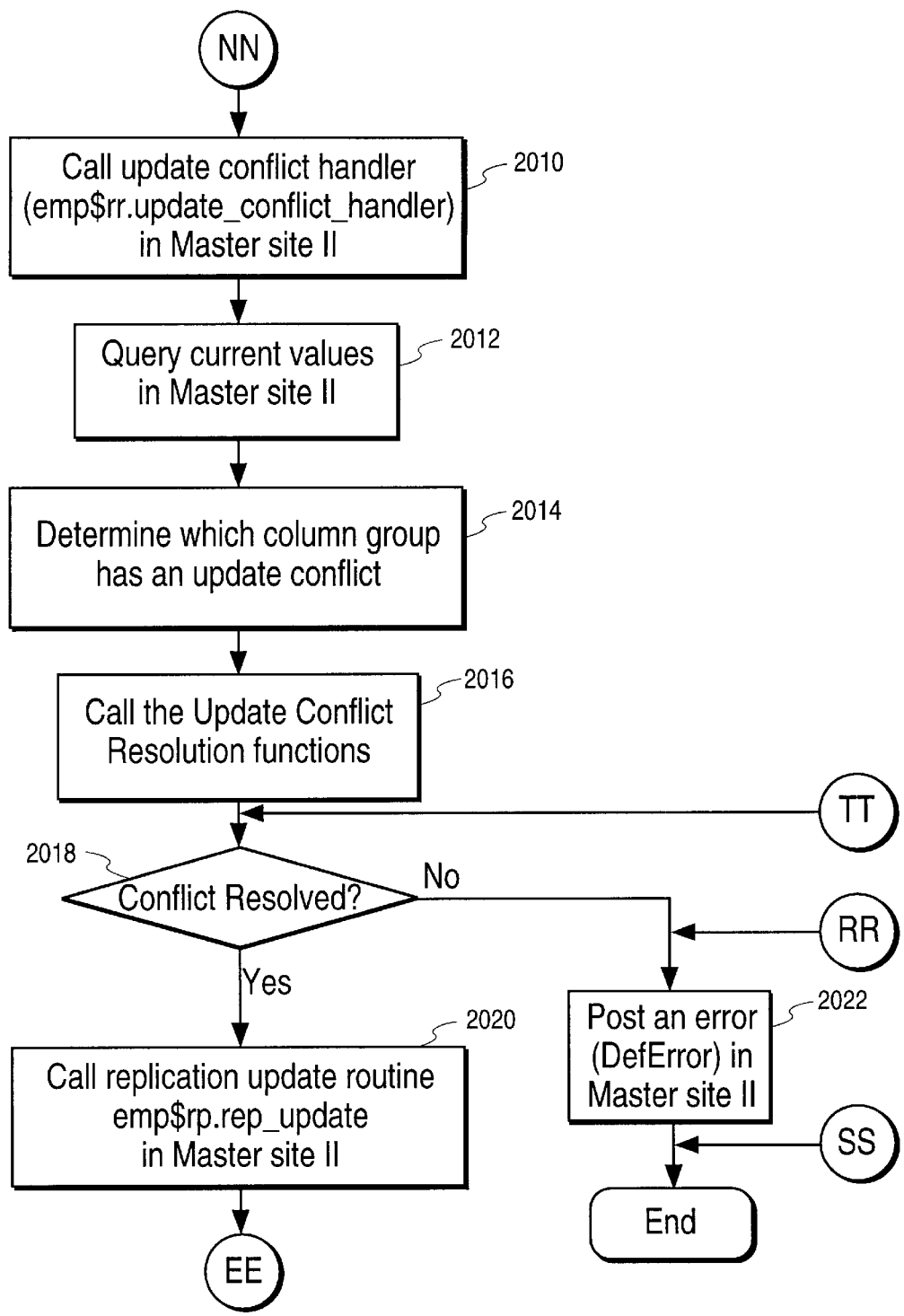

Referring now to FIG. 20, the processing performed when an update conflict is detected is shown with the automatic generation of audit information selected. First, an update conflict handler (emp$rr.update_conflict_handler, in this example) is called in the Master site II in block 2010. The current table values in Master site II are queried in block 2012. The column groups are tested to determine which column group has an update conflict in block 2014. The corresponding update conflict resolution routine(s) are called in block 2016. If the update conflict is resolved, block 2020 in Master site II is executed to call the replication update routine emp$rp.rep_update, in this example. Processing then continues at the bubble labeled EE shown in FIG. 16 where the emp table is again recursively checked for update conflicts. If in block 2018 the update conflict is not resolved, an error is posted in block 2022 and processing terminates at the End bubble shown in FIG. 20.

Figure 21:
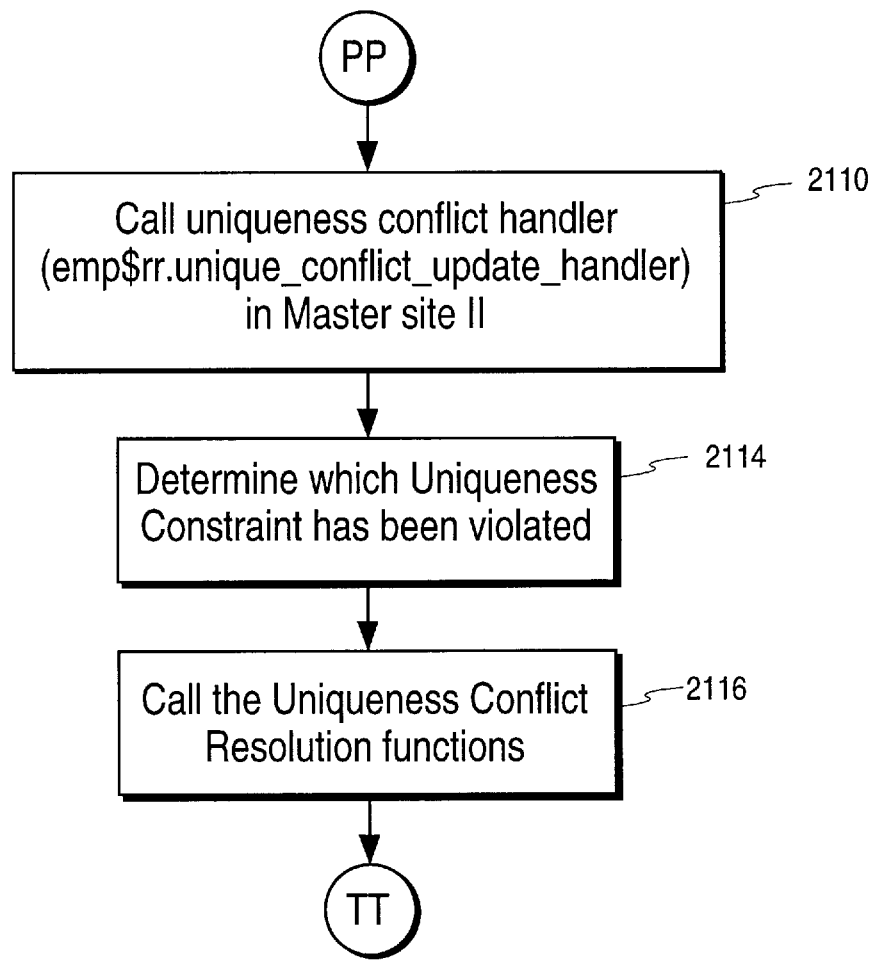

Referring now to FIG. 21, the processing performed when a uniqueness conflict is detected is shown with the automatic generation of audit information selected. First, a uniqueness conflict handler (emp$rr.unique_conflict_update_handler, in this example) is called in the Master site II in block 2110. The uniqueness constraint that was violated is determined in block 2114. The corresponding uniqueness conflict resolution routine(s) are called in block 2116. Processing continues at the bubble labeled TT shown in FIG. 20 where a test is executed to determine if the uniqueness conflict was resolved.

This completes the conflict resolution process.

Automatic Generation of Audit Information

Some conflict resolution methods require additional information typically stored in an audit table, such as last update timestamp or last update site. The conflict resolution methods that require such audit information are listed below. A description of the audit information used by these methods is set forth above.

Earliest timestamp

Latest timestamp

Site Priority

When users use one of these conflict resolution methods, they have the option of generating and maintaining the audit information themselves in existing columns of the same table. If users do not specify which existing columns in the table store the audit information, the present invention will automatically generate and maintain the audit information in a shadow table. If users do specify which existing columns in the table store the audit information, the present invention will assume that the application will generate and maintain the audit information.

Every replicated table can have one and only one shadow table in the preferred embodiment. The present invention creates a shadow table if none exists, or modifies the table definition if the generated shadow table already exists. Once a shadow table has been created, the present invention can only add new columns to the shadow table. It is possible that the present invention may fail to add new columns to a shadow table if there are obsolete columns in the shadow table. Some columns become obsolete when users change their use of conflict resolution methods that require automatic generation of audit information. It is recommended that the database administrator periodically removes obsolete columns from the shadow tables.

The present invention treats a shadow table as if it were an extension of the replicated table. Because of this, the "shadow table" for snapshot replicated object must be a snapshot at the snapshot site and must be in the same refresh group as the snapshot replicated object.

A shadow table has the following columns:

The primary key columns of the table.

Optionally a date column for every column group that requires auditing of timestamp.

Optionally a varchar2(128) column for every column for every column group that requires auditing of site's global database name.

In the preferred embodiment of the present invention, the name of the shadow table is derived by appending $ra to the table name. The present invention truncates the table name to accommodate the additional characters when necessary. If the derived name conflicts with an existing one, the present invention uses an arbitrary name with $ra appended.

The present invention uses the exact primary key column names in the shadow table. As for other columns in the shadow table, the present invention derives their names according to the type of audit information. The present invention uses "TIMESTAMP" as the name of a column used for storing timestamp, and "GLOBAL_NAME" as the name of a column used for storing site's global database name. The present invention appends a unique integer to the column name if that column name already exists.

Thus, an apparatus and method for providing adaptable and configurable conflict resolution within a replicated data environment is disclosed. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. In a distributed database system having a first replica of a data structure and a second replica of said data structure, a configurable conflict resolution apparatus comprising:

a conflict detection module for detecting a conflicting modification to corresponding portions of said first and said second replicas;

a plurality of conflict resolution methods, one or more of said plurality of conflict resolution methods being configurably associated with said corresponding portions of said first and said second replicas; and a conflict resolution module for activating a first conflict resolution method of said one or more of said plurality of conflict resolution methods when said conflict detection module detects said conflicting modification to said corresponding portions of said first and said second replicas.

2. The configurable conflict resolution apparatus as claimed in claim 1 wherein said conflict resolution module further includes processing logic for determining if said first conflict resolution method successfully resolved said conflicting modification.

3. The configurable conflict resolution apparatus as claimed in claim 2 wherein said conflict resolution module further includes processing logic for activating a second conflict resolution module if said first conflict resolution method was not successful in resolving said conflicting modification.

4. The configurable conflict resolution apparatus as claimed in claim 2 wherein said conflict resolution module further includes processing logic for activating each of said one or more of said plurality of conflict resolution methods until one or more of said conflict resolution methods is successful in resolving said conflicting modification or until all conflict resolution methods have been tried at least once.

5. The configurable conflict resolution apparatus as claimed in claim 4 wherein said conflict resolution module further includes processing logic for storing non-conflicting values in said corresponding portions of said first and said second replicas if one of said conflict resolution methods was successful in resolving said conflicting modification.

6. The configurable conflict resolution apparatus as claimed in claim 5 further including a means for deferring storing of non-conflicting values until after a complete portion of said first and said second replicas is checked for other conflicting modifications.

7. The configurable conflict resolution apparatus as claimed in claim 4 wherein said conflict resolution module further includes processing logic for logging an error if none of said conflict resolution methods was successful in resolving said conflicting modification.

8. The configurable conflict resolution apparatus as claimed in claim 4 wherein a priority is assigned to each of said plurality of conflict resolution methods and said conflict resolution module activates each of said plurality of conflict resolution methods in priority order.

9. The configurable conflict resolution apparatus as claimed in claim 1 wherein at least one of said plurality of conflict resolution methods is registered by a user.

10. The configurable conflict resolution apparatus as claimed in claim 1 wherein at least one of said plurality of conflict resolution methods is a minimum value method.

11. The configurable conflict resolution apparatus as claimed in claim 1 wherein at least one of said plurality of conflict resolution methods is a maximum value method.

12. The configurable conflict resolution apparatus as claimed in claim 1 wherein at least one of said plurality of conflict resolution methods is an earliest timestamp method.

13. The configurable conflict resolution apparatus as claimed in claim 1 wherein at least one of said plurality of conflict resolution methods is a priority group method.

14. The configurable conflict resolution apparatus as claimed in claim 1 wherein at least one of said plurality of conflict resolution methods is a site priority method.

15. The configurable conflict resolution apparatus as claimed in claim 1 wherein at least one of said plurality of conflict resolution methods is an overwrite method.

16. The configurable conflict resolution apparatus as claimed in claim 1 wherein at least one of said plurality of conflict resolution methods is a discard method.

17. The configurable conflict resolution apparatus as claimed in claim 1 wherein at least one of said plurality of conflict resolution methods is an average value method.

18. The configurable conflict resolution apparatus as claimed in claim 1 wherein at least one of said plurality of conflict resolution methods is an additive value method.

19. The configurable conflict resolution apparatus as claimed in claim 1 wherein said conflicting modification is an update conflict.

20. The configurable conflict resolution apparatus as claimed in claim 1 wherein said conflicting modification is a uniqueness conflict.

21. The configurable conflict resolution apparatus as claimed in claim 1 wherein said conflicting modification is a delete conflict.

22. The configurable conflict resolution apparatus as claimed in claim 1 further including audit logic for automatically generating and maintaining audit information in a shadow data structure.

23. The configurable conflict resolution apparatus as claimed in claim 1 further including recursion logic for recursively activating said first conflict resolution method until no further modifications to said corresponding portions of said first and second replicas is detected.

24. In a distributed database system having a first replica of a data structure and a second replica of said data structure, a method for configurable conflict resolution comprising the steps of:

detecting a conflicting modification to corresponding portions of said first and said second replicas;

providing a plurality of conflict resolution methods, one or more of said plurality of conflict resolution methods being configurably associated with said corresponding portions of said first and said second replicas; and activating a first conflict resolution method of said one or more of said plurality of conflict resolution methods when said conflicting modification is detected in said detecting step.

25. For use in a distributed database system having a first replica of a data structure and a second replica of said data structure, an article of manufacture comprising a computer usable mass storage medium having computer readable program code embodied therein for causing a processing means to perform configurable conflict resolution, said computer readable program code in said article of manufacture comprising:

a conflict detection module for causing said processing means to detect a conflicting modification to corresponding portions of said first and said second replicas;

a plurality of conflict resolution methods, one or more of said plurality of conflict resolution methods being configurably associated with said corresponding portions of said first and said second replicas; and a conflict resolution module for causing said processing means to activate a first conflict resolution method of said one or more of said plurality of conflict resolution methods when said conflict detection module detects said conflicting modification to said corresponding portions of said first and said second replicas.

26. The article of manufacture as claimed in claim 25 wherein said conflict resolution module further includes a processing logic code segment for determining if said first conflict resolution method successfully resolved said conflicting modification.

27. The article of manufacture as claimed in claim 26 wherein said conflict resolution module further includes a processing logic code segment for activating a second conflict resolution module if said first conflict resolution module was not successful in resolving said conflicting modification.

28. The article of manufacture as claimed in claim 26 wherein said conflict resolution module further includes a processing logic code segment for activating each of said one or more of said plurality of conflict resolution methods until one or more of said conflict resolution methods is successful in resolving said conflicting modification or until all conflict resolution methods have been tried at least once.

29. The article of manufacture as claimed in claim 28 wherein said conflict resolution module further includes a processing logic code segment for storing non-conflicting values in said corresponding portions of said first and said second replicas if one of said conflict resolution methods was successful in resolving said conflicting modification.

30. The article of manufacture as claimed in claim 29 further including a means for deferring storing of non-conflicting values until after a complete portion of said first and said second replicas is checked for other conflicting modifications.

31. The article of manufacture as claimed in claim 28 wherein said conflict resolution module further includes a processing logic code segment for logging an error if none of said conflict resolution methods was successful in resolving said conflicting modification.

32. The article of manufacture as claimed in claim 25 wherein at least one of said plurality of conflict resolution methods is registered by a user.

33. In a distributed database system having a first replica of a data structure and a second replica of the same data structure, a configurable conflict resolution apparatus comprising:

conflict detection means for detecting a conflicting modification to corresponding portions of said first and said second replicas;

a plurality of conflict resolution means, one or more of said plurality of conflict resolution means being configurably associated with said corresponding portions of said first and said second replicas; and activation means for activating a first conflict resolution means of said one or more of said plurality of conflict resolution means when said conflict detection means detects said conflicting modification to said corresponding portions of said first and said second replicas.

34. The configurable conflict resolution apparatus as claimed in claim 33 wherein said conflict resolution means further includes processing logic for determining if said first conflict resolution means successfully resolved said conflicting modification.

35. The configurable conflict resolution apparatus as claimed in claim 34 wherein said conflict resolution means further includes processing logic for activating a second conflict resolution means if said first conflict resolution means was not successful in resolving said conflicting modification.

36. The configurable conflict resolution apparatus as claimed in claim 34 wherein said conflict resolution means further includes processing logic for activating each of said one or more of said plurality of conflict resolution means until one or more of said conflict resolution means is successful in resolving said conflicting modification or until all conflict resolution means have been tried at least once.

37. The configurable conflict resolution apparatus as claimed in claim 36 wherein said conflict resolution means further includes processing logic for storing non-conflicting values in said corresponding portions of said first and said second replicas if one of said conflict resolution means was successful in resolving said conflicting modification.

38. The configurable conflict resolution apparatus as claimed in claim 37 further including a means for deferring storing on non-conflicting values until after a complete portion of said first and said second replicas are checked for other conflicting modifications.

39. The configurable conflict resolution apparatus as claimed in claim 36 wherein said conflict resolution means further includes processing logic for logging an error if none of said conflict resolution means was successful in resolving said conflicting modification.

40. The configurable conflict resolution apparatus as claimed in claim 33 wherein at least one of said plurality of conflict resolution means is registered by a user.

41. A computer data signal embodied in a carrier wave comprising:
a conflict detection code segment for detecting a conflicting modification to corresponding portions of a first replica and a second replica of a data structure in a distributed database system;
a plurality of conflict resolution method code segments, one or more of said plurality of conflict resolution code segments being configurably associated with said corresponding portions of said first and said second replicas; and
a conflict resolution module code segment for activating a first conflict resolution code segment of said one or more of said plurality of conflict resolution code segments when said conflict detection code segment detects said conflicting modification to said corresponding portions of said first and said second replicas.

42. The computer data signal embodied in a carrier wave as claimed in claim 41 wherein said conflict resolution module code segment further includes a processing logic code segment for determining if said first conflict resolution method code segment successfully resolved said conflicting modification.

43. The computer data signal embodied in a carrier wave as claimed in claim 42 wherein said conflict resolution module code segment further includes a processing logic code segment for activating a second conflict resolution module code segment if said first conflict resolution module code segment was not successful in resolving said conflicting modification.

44. The computer data signal embodied in a carrier wave as claimed in claim 42 wherein said conflict resolution module code segment further includes a processing logic code segment for activating each of said one or more of said plurality of conflict resolution method code segments until one or more of said conflict resolution method code segments is successful in resolving said conflicting modification or until all conflict resolution method code segments have been tried at least once.

45. The computer data signal embodied in a carrier wave as claimed in claim 44 wherein said conflict resolution module code segment further includes a processing logic code segment for storing non-conflicting values in said corresponding portions of said first and said second replicas if one of said conflict resolution method code segments was successful in resolving said conflicting modification.

46. The computer data signal embodied a carrier wave as claimed in claim 45 further including a means for deferring storing of non-conflicting values until after a complete portion of said first and said second replicas is checked for other conflicting modifications.

47. The computer data signal embodied in a carrier wave as claimed in claim 44 wherein said conflict resolution module code segment further includes a processing logic code segment for logging an error if none of said conflict resolution method code segments was successful in resolving said conflicting modification.

48. The computer data signal embodied in a carrier wave as claimed in claim 41 wherein at least one of said plurality of conflict resolution method code segments is registered by a user.

* * * * *